(12) United States Patent
Mizutani et al.

(10) Patent No.: US 7,703,780 B2
(45) Date of Patent: Apr. 27, 2010

(54) WHEEL SUPPORTING APPARATUS IMPROVING RIDE COMFORT OF VEHICLE

(75) Inventors: Ryoji Mizutani, Nishikamo-gun (JP); Yuki Tojima, Chita (JP); Shigetaka Isogai, Nishio (JP); Atsushi Torii, Nishio (JP); Junichiro Sakurai, Chiryu (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 846 days.

(21) Appl. No.: 10/570,947

(22) PCT Filed: Sep. 24, 2004

(86) PCT No.: PCT/JP2004/014462
§ 371 (c)(1),
(2), (4) Date: Mar. 7, 2006

(87) PCT Pub. No.: WO2005/030509
PCT Pub. Date: Apr. 7, 2005

(65) Prior Publication Data
US 2007/0068715 A1    Mar. 29, 2007

(30) Foreign Application Priority Data
Sep. 30, 2003 (JP) ............... 2003-341169
Feb. 9, 2004  (JP) ............... 2004-032323

(51) Int. Cl.
*B60G 9/00* (2006.01)

(52) U.S. Cl. ............... 280/124.1; 280/124.144; 280/124.169

(58) Field of Classification Search .......... 280/124.135, 280/124.136, 124.177, 124.1, 124.11, 124.15, 280/124.155, 5.515, 5.516, 5.52, 124.144, 280/124.169; 180/6.48, 65.5; 310/54, 64, 310/83
See application file for complete search history.

(56) References Cited

U.S. PATENT DOCUMENTS

| | | | |
|---|---|---|---|
| 2,901,239 A | 8/1959 | Sethna | |
| 3,347,333 A | 10/1967 | Edwards | |
| 4,650,211 A * | 3/1987 | Tanahashi | 280/124.144 |

(Continued)

FOREIGN PATENT DOCUMENTS

DE    1 405 857 A    6/1970

(Continued)

OTHER PUBLICATIONS

Nagaya et al., "Development of an In-Wheel Motor with Advanced Dynamic-Damper Mechanism," Proceedings of Annual Congress, Society of Automotive Engineers of Japan, Inc., No. 83-02, pp. 9-12 (Nov. 26, 2002).

*Primary Examiner*—Hau V Phan
(74) *Attorney, Agent, or Firm*—Oliff & Berridge, PLC

(57) ABSTRACT

A wheel supporting apparatus includes dampers, ball joints, a knuckle, an upper arm and a lower arm. The dampers are attached to a case of an in-wheel motor in the top-bottom direction of the vehicle's body and are connected respectively to the ball joints. The upper arm and the lower arm have respective one-ends connected to respective dampers via the ball joints and respective other ends pivotably fixed to the vehicle's body. The knuckle is connected to the ball joints to rotatably support a wheel hub via hub bearings.

24 Claims, 12 Drawing Sheets

U.S. PATENT DOCUMENTS

| | | |
|---|---|---|
| 4,991,698 A | 2/1991 | Hanson |
| 5,087,229 A * | 2/1992 | Hewko et al. ............... 475/149 |
| 5,156,579 A * | 10/1992 | Wakuta et al. .............. 475/161 |
| 5,163,528 A * | 11/1992 | Kawamoto et al. ......... 180/65.5 |
| 6,364,078 B1 | 4/2002 | Parison et al. |
| 6,722,459 B1 * | 4/2004 | Wendl et al. ................ 180/65.5 |
| 7,118,119 B2 * | 10/2006 | Amanuma ........... 280/124.135 |
| 7,243,749 B2 * | 7/2007 | Kakinami et al. .......... 180/65.5 |
| 7,320,376 B2 * | 1/2008 | Kurata ....................... 180/65.5 |
| 7,347,295 B2 * | 3/2008 | Kurata ....................... 180/65.5 |
| 2003/0053817 A1 * | 3/2003 | Nagaya ..................... 180/6.48 |
| 2004/0080223 A1 | 4/2004 | Shimizu |
| 2004/0099455 A1 | 5/2004 | Nagaya |
| 2006/0048978 A1 * | 3/2006 | Nagaya ..................... 180/6.48 |

FOREIGN PATENT DOCUMENTS

| | | |
|---|---|---|
| DE | 100 34 603 A1 | 1/2002 |
| EP | 0 344 923 A1 | 12/1989 |
| EP | 0 982 162 A2 | 3/2000 |
| EP | 1 380 459 A1 | 1/2004 |
| JP | A-02-037012 | 2/1990 |
| JP | A-06-143966 | 5/1994 |
| JP | A 07-081430 | 3/1995 |
| JP | A 11-170831 | 6/1999 |
| JP | A-2000-309269 | 11/2000 |
| JP | A 2000-343920 | 12/2000 |
| JP | A 2001-315534 | 11/2001 |
| JP | A 2004-90793 | 3/2004 |
| WO | WO 02/066280 A1 | 8/2002 |
| WO | WO 02/083446 A1 | 10/2002 |
| WO | WO 2004/030971 A1 | 4/2004 |

* cited by examiner

F I G. 1
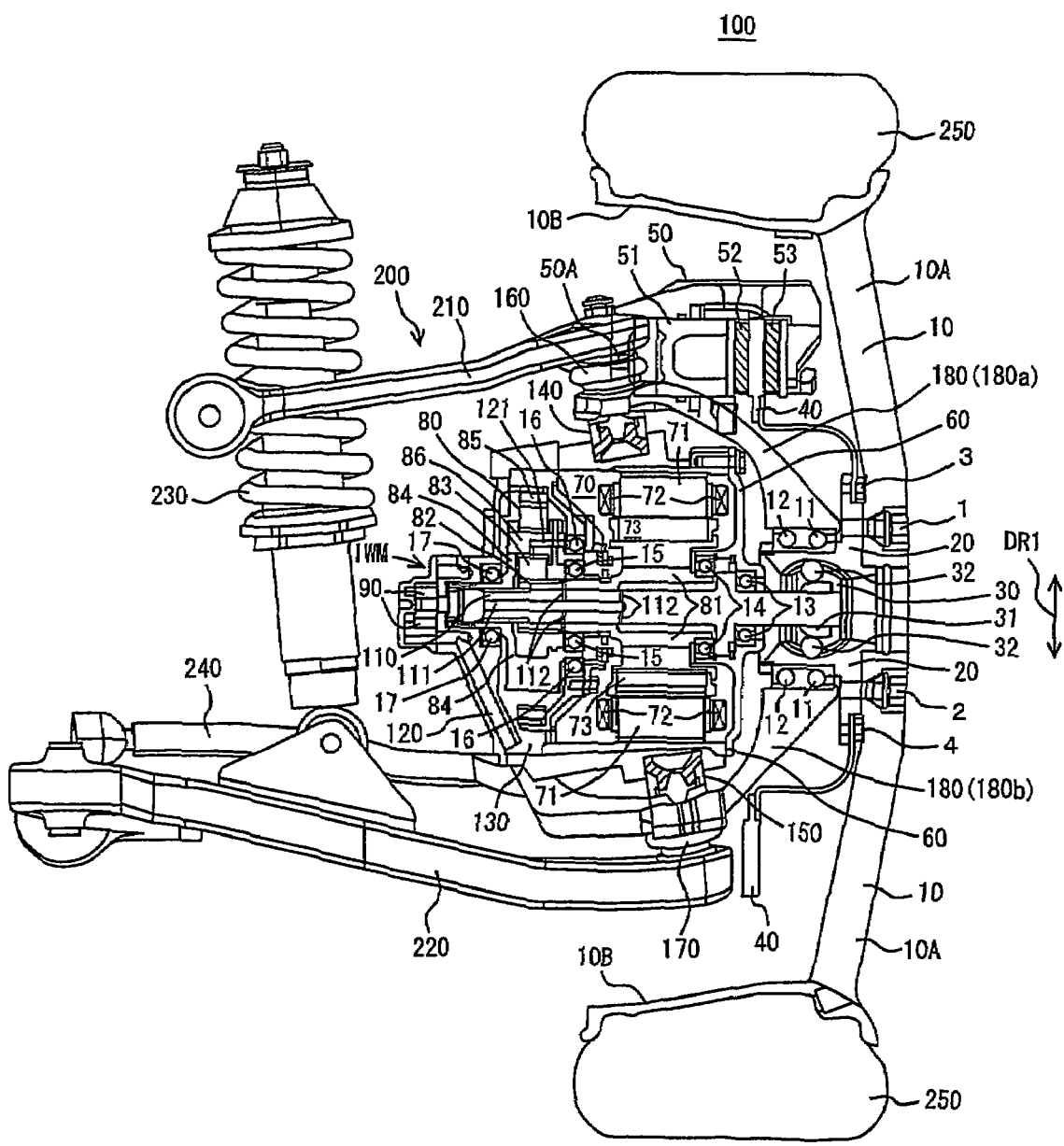

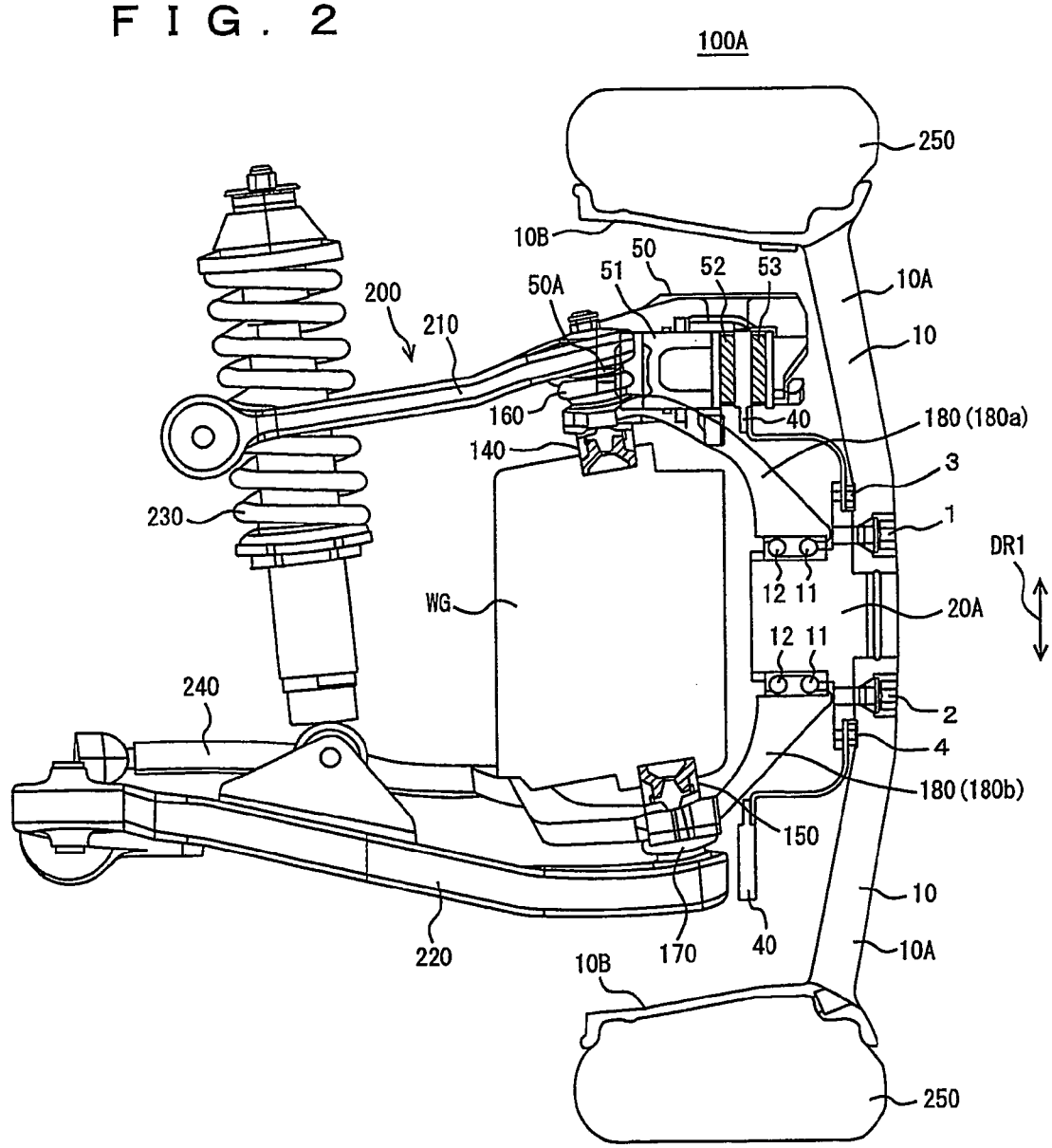
F I G. 2

WHEEL SUPPORTING APPARATUS IMPROVING RIDE COMFORT OF VEHICLE

TECHNICAL FIELD

The present invention relates to a wheel supporting apparatus improving ride comfort of vehicles.

BACKGROUND ART

Regarding a conventional in-wheel motor drive system, Japanese Patent Laying-Open Nos. 07-81430, 2000-343920, 2001-315534 and 11-170831 for example disclose that a motor is housed in an outer frame and an output shaft of the motor is rotatably supported on the outer frame by a bearing unit. One end of the output shaft is connected via a planetary gear to a wheel.

The outer frame that houses the motor is connected via a ball joint to a suspension arm. The suspension arm is connected via a shock absorber to a body of a vehicle (Japanese Patent Laying-Open No. 07-81430).

As seen from the above, in the conventional in-wheel motor system, the outer frame that houses the motor is connected to the vehicle's body via the ball joint and the suspension arm.

Further, from "Development of Dynamic-Damper Type In-Wheel Motor" by Goh Nagaya, Yasumichi Wakao and Akihiko Abe, Proceedings of Annual Congress, Society of Automotive Engineers of Japan, Inc., No. 83-02, pp. 9-12, Nov. 26, 2002, a conventional in-wheel motor drive system is known according to which a hollow motor is supported by a motor suspension. The hollow motor is connected to a wheel to rotate it. The hollow motor is supported by the motor suspension so that the hollow motor can vibrate in the top-bottom direction of the vehicle and is accordingly isolated from the unsprung weight. The wheel is supported on the vehicle by a suspension arm. Regarding this in-wheel motor drive system, when the wheel unit (including the tire) vibrates, the hollow motor receives the vibrations of the wheel unit via the wheel to vibrate in the top-bottom direction of the vehicle. The vibrations of the hollow motor cancel vibrations of the unsprung part of the vehicle.

The conventional in-wheel motor drive system, however, encounters a problem as described below. When the wheel is displaced due to road surface conditions for example, the motor is also displaced so that there arises an unsprung input to the vehicle's body via the ball joint and the suspension arm, resulting in deterioration in ride comfort of the vehicle.

DISCLOSURE OF THE INVENTION

An object of the present invention is to provide a wheel supporting apparatus with which ride comport of vehicles can be improved.

According to the present invention, a wheel supporting apparatus includes an elastic member, a suspension arm and a rotatably supporting member. The elastic member is attached to a load member provided in a wheel of a wheel unit and placed to allow vibrations of the wheel unit and vibrations of the load member to dampen each other. The suspension arm has one end connected to the elastic member and the other end fixed to a vehicle body pivotably in the top-bottom direction of the vehicle body. The rotatably supporting member is connected to the suspension arm and the elastic member to rotatably support the wheel.

Preferably, the load member is an in-wheel motor. The in-wheel motor includes: a motor generating motive power; a motor output shaft connected to the wheel via a constant velocity joint to allow the motive power generated by the motor to be transmitted to the wheel; and a case housing the motor. The elastic member is attached to the case.

Preferably, the motor output shaft is comprised of a first output shaft and a second output shaft. The first output shaft is connected to the motor, and the second output shaft has one end fitted into the first output shaft and the other end connected to the constant velocity joint.

Preferably, the load member is a weight provided to the wheel without connected to the wheel.

Preferably, the suspension arm is comprised of an upper arm and a lower arm. The elastic member is connected to at least one of the upper arm and the lower arm.

Preferably, the elastic member is comprised of a pair of elastic members. One of the pair of elastic members is connected to the upper arm, and the other of the pair of elastic members is connected to the lower arm.

Preferably, the pair of elastic members is connected to the load member in the top-bottom direction of the vehicle body. The upper arm and the lower arm are connected to the pair of elastic members in the top-bottom direction of the vehicle body.

Preferably, the pair of elastic members is comprised of a pair of front elastic members and a pair of rear elastic members. The pair of front elastic members is connected to the upper arm and the lower arm and attached to the load member in the top-bottom direction of the vehicle body. The pair of rear elastic members is connected to the upper arm and the lower arm and attached to the load member in the top-bottom direction of the vehicle body. The pair of front elastic members and the pair of rear elastic members are placed in the front-rear direction of the vehicle body.

Preferably, the pair of front elastic members and the pair of rear elastic members are each a rubber mount.

Preferably, the pair of elastic members further includes a pair of middle elastic members connected to the upper arm and the lower arm and attached to the load member in the top-bottom direction of the vehicle body. The pair of middle elastic members is made of a material different from a material of which the pair of front elastic members and the pair of rear elastic members are made and is placed between the pair of front elastic members and the pair of rear elastic members in the front-rear direction of the vehicle body.

Preferably, the pair of front elastic members and the pair of rear elastic members are each comprised of a rubber mount. The pair of middle elastic members is each comprised of a spring.

Preferably, the pair of front elastic members and the pair of rear elastic members are each comprised of a spring. The pair of middle elastic members is each comprised of a rubber mount.

Preferably, the elastic member is comprised of an upper elastic member and a lower elastic member. The upper elastic member is connected to the upper arm. The lower elastic member is connected to the lower arm.

Preferably, the upper elastic member and the lower elastic member are attached to the load member in the top-bottom direction of the vehicle body. The upper arm and the lower arm are connected respectively to the upper elastic member and the lower elastic member in the top-bottom direction of the vehicle body.

Preferably, the upper elastic member and the lower elastic member are each comprised of at least one elastic body.

Preferably, at least one elastic body is each a rubber mount.

Preferably, the upper elastic member and the lower elastic member are each comprised of at least one first elastic body and a second elastic body different from the first elastic body.

Preferably, at least one first elastic body is each a rubber mount, and the second elastic body is a spring.

Preferably, at least one first elastic body is each a spring, and the second elastic body is a rubber mount.

Preferably, the elastic member is comprised of a pair of elastic members. The pair of elastic members is connected to the upper arm via a pair of arm members. The lower arm is provided to the load member and the pair of elastic members without connected to the load member and the pair of elastic members. The lower arm has one end connected to the rotatably supporting member and the other end fixed to the vehicle body pivotably in the top-bottom direction of the vehicle body.

Preferably, the pair of elastic members is attached to the load member in the front-rear direction of the vehicle body. The pair of arm members is connected to the pair of elastic members in the front-rear direction of the vehicle body. The upper arm has one end connected to the rotatably supporting member and the pair of arm members and the other end fixed to the vehicle body pivotably in the top-bottom direction of the vehicle body. The upper arm and the lower arm are placed in the top-bottom direction of the vehicle body.

Preferably, the elastic members of the pair of elastic members are placed on respective sides opposite to each other of the load member in the front-rear direction of the vehicle body and are able to expand and contract in the top-bottom direction of the vehicle body.

Preferably, the wheel supporting apparatus further includes an extension member fixed to the load member and extending from the load member in the front-rear direction of the vehicle body. The pair of elastic members has one end connected to the extension member and the other end connected to the pair of arm members.

Preferably, the pair of elastic members includes a pair of suspensions.

The wheel supporting apparatus of the present invention includes the elastic member placed to allow vibrations of the wheel unit and vibrations of the load member to dampen each other, so that the vibrations of the load member cancel the vibrations of the wheel unit. Thus, the vibrations of the wheel unit are hindered from being transmitted via the suspension arm to the vehicle body.

In this way, according to the present invention, the unsprung input from the wheel unit can be alleviated to improve ride comfort of the vehicle.

Further, the wheel supporting apparatus of the present invention includes the elastic member placed to allow vibrations of the wheel unit having the in-wheel motor mounted thereon as the load member and vibrations of the load member to dampen each other. Moreover, the in-wheel motor is connected to the wheel via the constant velocity joint. Thus, as the wheel unit vibrates, vibrations of the in-wheel motor cancel the vibrations of the wheel unit. Moreover, skew between the output shaft of the in-wheel motor and the wheel is permitted. Thus, even if any displacement of the wheel occurs, displacement of the in-wheel motor is prevented. Accordingly, vibrations of the wheel unit and displacement of the wheel are hindered from being transmitted via the suspension arm to the vehicle body.

In this way, according to the present invention, the unsprung input from the wheel unit having the in-wheel motor mounted thereon can be alleviated to improve ride comfort of the vehicle driven by the in-wheel motor.

Still further, the wheel supporting apparatus of the present invention includes the elastic member placed to allow vibrations of the wheel unit having the weight mounted thereon as the load member and vibrations of the load member to dampen each other, so that the vibrations of the weight cancel the vibrations of the wheel unit. Thus, the vibrations of the wheel unit are hindered from being transmitted via the suspension arm to the vehicle body.

In this way, according to the present invention, the unsprung input from the normal wheel unit with the weight mounted thereon can be alleviated and thus ride comfort of the vehicle with the normal wheel unit mounted thereon can be improved.

Moreover, the wheel supporting apparatus of the present invention supports the load member via the upper elastic member and the lower elastic member or a pair of elastic members in the top-bottom direction of the vehicle body, so that the load member is readily caused to vibrate by vibrations of the wheel unit and the vibrations of the wheel unit are thus hindered from being transmitted via the suspension arm to the vehicle body.

In this way, according to the present invention, the unsprung input from the wheel unit can effectively be alleviated to improve ride comfort of the vehicle.

In addition, the wheel supporting apparatus of the present invention supports the load member via a pair of arm members and the pair of elastic members connected to only the upper arm which is a component of the suspension arm. Thus, the load member is readily caused to vibrate by vibrations of the wheel unit. Then, vibrations of the wheel unit are hindered from being transmitted via the suspension arm to the vehicle body.

In this way, according to the present invention, the unsprung input from the wheel unit can effectively be alleviated to improve ride comfort of the vehicle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic cross-sectional view of a wheel supporting apparatus and a motor-driven wheel supported thereby according to a first embodiment of the present invention.

FIG. 2 is another schematic cross-sectional view of the wheel supporting apparatus and a motor-undriven wheel supported thereby according to the first embodiment.

BEST MODES FOR CARRYING OUT THE INVENTION

Figure 3:
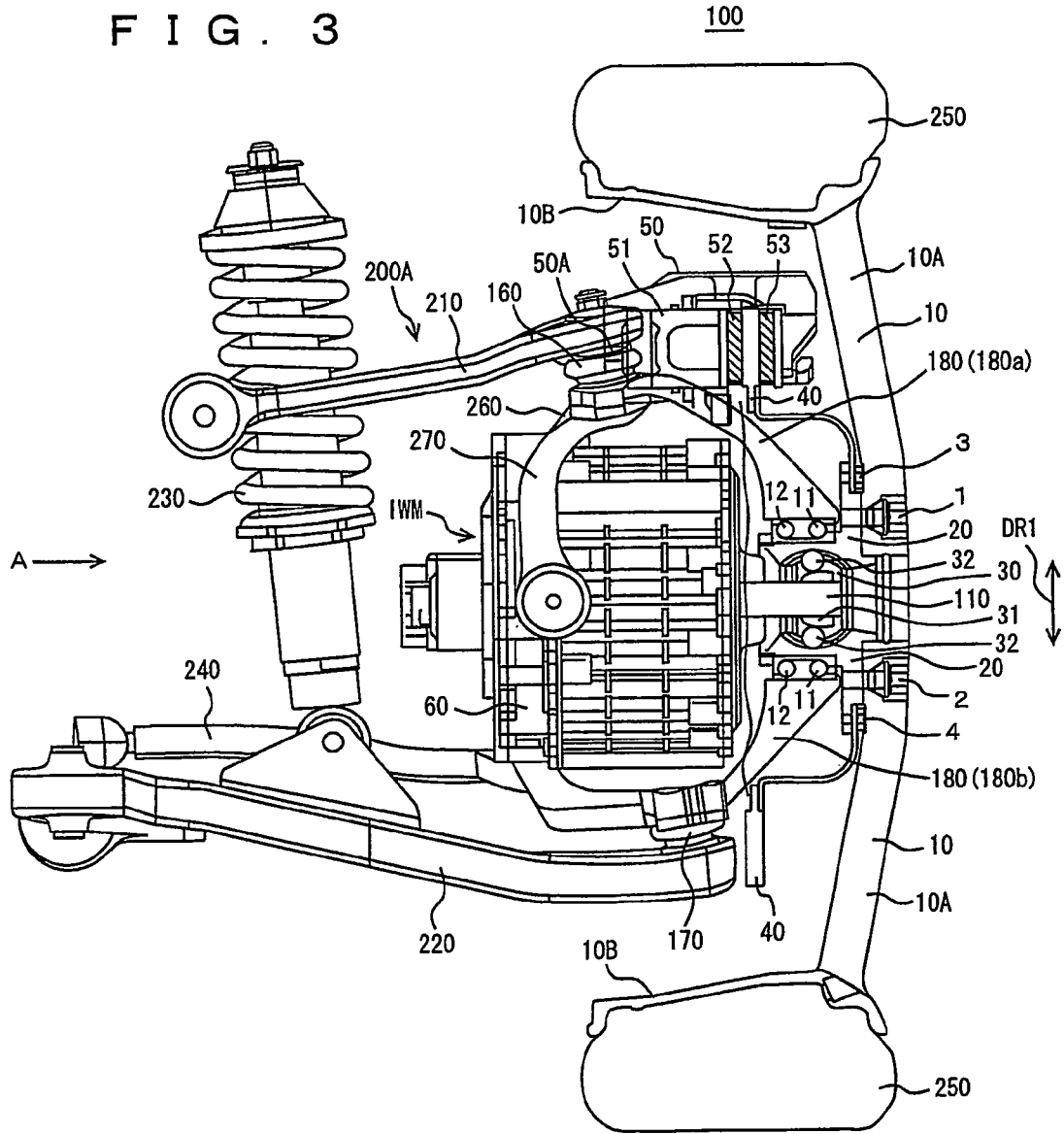
FIG. 3 is a schematic cross-sectional view of a wheel supporting apparatus and a motor-driven wheel supported thereby according to a second embodiment.

Embodiments of the present invention are hereinafter described in detail with reference to the drawings. It is noted that like components in the drawings are denoted by like reference characters and the description thereof is not repeated here.

First Embodiment

FIG. 1 is a schematic cross-sectional view of a wheel supporting apparatus and a motor-driven wheel supported thereby according to a first embodiment of the present invention. Referring to FIG. 1, motor-driven wheel 100 includes a wheel disc 10, a wheel hub 20, a constant velocity joint 30, a brake rotor 40, a brake caliper 50, an in-wheel motor IWM, and a tire 250.

In-wheel motor IWM includes a case 60, a motor 70, a planetary gear 80, an oil pump 90, a shaft 110, and an oil path 120.

Wheel supporting apparatus 200 includes dampers 140, 150, ball joints 160, 170, a knuckle 180, an upper arm 210, a lower arm 220, and a shock absorber 230.

Wheel disc 10 is substantially in the shape of a cup and comprised of a disc portion 10A and a rim portion 10B. Wheel disc 10 may house wheel hub 20, brake rotor 40, brake caliper 50 and in-wheel motor IWM. Wheel disc 10 is connected to wheel hub 20 by fastening disc portion 10A to wheel hub 20 with screws 1, 2. Wheel hub 20 contains constant velocity joint 30 therein and is connected to shaft 110 via the contained constant velocity joint 30. Wheel hub 20 is rotatably supported on knuckle 180 by means of hub bearings 11, 12.

Constant velocity joint 30 includes an inner 31 and a ball 32. Inner 31 is spline-fitted into shaft 110. Ball 32 engages with a groove of wheel hub 20 and a groove of inner 31 that are provided in the direction of the rotational axis of shaft 110 to rotate wheel hub 20 as shaft 110 is rotated. Further, ball 32 is movable in the direction of the rotational axis of shaft 110 along the grooves of wheel hub 20 and inner 31.

Brake rotor 40 has its inner peripheral end fixed to the outer peripheral end of wheel hub 20 with screws 3, 4 and its outer peripheral end placed to pass through brake caliper 50. Brake caliper 50 is fixed to knuckle 180. Brake caliper 50 includes a brake piston 51 and brake pads 52, 53. The outer peripheral end of brake rotor 40 is sandwiched between brake pads 52, 53.

When a brake oil is supplied from an opening 50A, brake piston 51 moves to the right (the terms "right(ward)" and "left(ward)" are herein used to mean the right and left as seen in the drawings) to push brake pad 52 rightward. As brake pad 52 is moved by brake piston 51 to the right, brake pad 53 is moved to the left in response thereto. Brake pads 52 and 53 thus hold the outer peripheral end of brake rotor 40 therebetween to brake motor-driven wheel 100.

Case 60 is placed on the left of wheel hub 20. Case 60 houses motor 70, planetary gear 80, oil pump 90, shaft 110 and oil path 120.

A motor 70 includes a stator core 71, stator coils 72 and a rotor 73. Stator core 71 is fixed to case 60. Stator coils 72 are wound around stator core 71. When motor 70 is a three-phase motor, stator coils 72 are comprised of U-phase, V-phase and W-phase coils.

Rotor 73 is provided inside the inner periphery of stator core 71 and stator coils 72.

Planetary gear 80 includes a sun gear shaft 81, a sun gear 82, a pinion gear 83, a planetary carrier 84, a ring gear 85, and a pin 86. Sun gear shaft 81 is connected to rotor 73 of motor 70. Sun gear shaft 81 is rotatably supported by bearings 14, 15. Sun gear 82 is connected to sun gear shaft 81.

Pinion gear 83 meshes with sun gear 82 and is rotatably supported by bearings provided on the outer periphery of pin 86. Planetary carrier 84 is connected to pinion gear 83 and spline-fitted into shaft 110. Planetary carrier 84 is rotatably supported by bearings 16, 17. Ring gear 85 is fixed to case 60. Pin 86 is supported by pinion gear 83 via bearings provided therearound.

Oil pump 90 is provided on one end of shaft 110. As described above, inner 31 of constant velocity joint 30 and planetary carrier 84 are spline-fitted into shaft 110 and shaft 110 is rotatably supported by bearings 13, 17. Shaft 110 contains an oil path 111 and oil holes 112.

An oil path 121 is provided within pin 86 of planetary gear 80. Oil path 120 has one end connected to oil pump 90 and the other end inserted into an oil reservoir 130.

Oil pump 90 pumps up oil stored in oil reservoir 130 via oil path 120 and supplies the pumped-up oil to oil path 111.

Tire 250 is fixed to rim portion 10B of wheel disc 10.

Dampers 140, 150 are structured to have rubber in which an oil is enclosed and attached to case 60 of in-wheel motor IWM. Specifically, dampers 140, 150 are attached to case 60 in the top-bottom direction indicated by the double-pointed arrow DR1 of the body of the vehicle. Ball joints 160, 170 are attached respectively to dampers 140, 150.

Knuckle 180 (180a) has one end connected to ball joint 160 and the other end connected to wheel hub 20 via hub bearings 11, 12. Knuckle 180 (180b) has one end connected to ball joint 170.

Upper arm 210 and lower arm 220 are placed in the top-bottom direction DR1 of the vehicle's body. Upper arm 210 has one end connected to ball joint 160 and the other end fixed to the vehicle's body pivotably in the top-bottom direction DR1 of the vehicle's body. Lower arm 220 has one end connected to ball joint 170 and the other end fixed to the vehicle's body pivotably in the top-bottom direction DR1 of the vehicle's body. Lower arm 220 is connected to the vehicle's body via shock absorber 230. Motor-driven wheel 100 is thus suspended from the vehicle's body.

In this way, upper arm 210 and lower arm 220 are connected respectively via ball joints 160, 170 to dampers 140, 150 in the top-bottom direction DR1 of the vehicle's body.

A link 240 has one end connected to ball joint 170. In response to rotational force from the steering wheel of the vehicle, link 240 pivots motor-driven wheel 100 rightward or leftward with respect to the running direction of the vehicle.

Upper arm 210 and lower arm 220 are fixed to the vehicle's body pivotably in the top-bottom direction DR1 of the vehicle's body and lower arm 220 is connected via shock absorber 230 to the vehicle's body. Thus, upper arm 210, lower arm 220 and shock absorber 230 serve as a suspension. Upper arm 210 and lower arm 220 thus constitute "suspension arm".

Wheel supporting apparatus 200 fixes dampers 140, 150 to case 60 of in-wheel motor IWM and connects the suspension arm (upper arm 210 and lower arm 220) to dampers 140, 150 and knuckle 180 by means of ball joints 160, 170, thereby allowing motor-driven wheel 100 to be supported on the vehicle's body.

Specifically, wheel supporting apparatus 200 uses upper arm 210, lower arm 220 and knuckle 180 to rotatably support wheel disc 10 and wheel hub 20 and uses upper arm 210, lower arm 220 and dampers 140, 150 to support in-wheel motor IWM in a manner that allows in-wheel motor IWM to vibrate in the top-bottom direction DR1 of the vehicle's body.

When motor-driven wheel 100 receives vibrations in the top-bottom direction DR1 of the vehicle's body due to road surface conditions while the vehicle is running, dampers 140, 150 are deformed in the top-bottom direction DR1 of the vehicle's body by in-wheel motor IWM (motor 70) serving as a damper mass. Then, vibrations of in-wheel motor IWM (motor 70) are generated in the top-bottom direction DR1. Here, the vibrations of in-wheel motor IWM are out of phase from the vibrations received by motor-driven wheel 100. In other words, dampers 140, 150 convert the vibrations of motor-driven wheel 100 into the vibrations of motor 70. Dampers 140 and 150 accordingly allow in-wheel motor IWM to cancel the vibrations received by motor-driven wheel 100. Specifically, dampers 140, 150 are placed to allow the vibrations of motor-driven wheel 100 and the vibrations of in-wheel motor IWM to dampen each other and thereby hinder the vibrations of motor-driven wheel 100 from being transmitted via upper arm 210 and lower arm 220 to the vehicle's body.

In this way, the unsprung input from tire 250 is alleviated. Namely, a part of the vibrations that cannot be absorbed by shock absorber 230 is absorbed. Ride comfort of the vehicle is thus improved.

When AC current is supplied to stator coils 72 by a switching circuit (not shown) mounted on the vehicle's body, rotor 73 rotates so that motor 70 outputs a predetermined torque. The output torque of motor 70 is transmitted via sun gear shaft 81 to planetary gear 80. Planetary gear 80 converts, namely changes (reduces) the output torque from sun gear shaft 81 with sun gear 82 and pinion gear 83 to output the resultant torque to planetary carrier 84. Planetary carrier 84 transmits the output torque of planetary gear 80 to shaft 110. Shaft 110 then rotates wheel hub 20 and wheel disc 10 at a predetermined number of revolutions via constant velocity joint 30. Accordingly, motor-driven wheel 100 rotates at the predetermined number of revolutions.

Oil pump 90 pumps up the oil via oil path 120 from oil reservoir and supplies the pumped-up oil to oil path 111 provided within shaft 110.

The oil supplied into oil path 111 is discharged from oil holes 112 by a centrifugal force generated by rotations of shaft 110 while the oil is transported through oil path 111. Then, oil path 121 supplies the oil discharged from shaft 110 to planetary gear 80 to lubricate planetary gear 80. Further, the oil discharged from shaft 110 cools stator coils 72 and lubricates bearings 14-17.

When motor-driven wheel 100 receives vibrations due to road surface conditions while the vehicle is running, dampers 140, 150 use the vibrations received by motor-driven wheel 100 to vibrate in-wheel motor IWM (motor 70) in the top-bottom direction DR1 of the vehicle's body, the vibrations of in-wheel motor IWM being out of phase from the vibrations received by motor-driven wheel 100, thereby preventing large vibrations from being transmitted to a sprung part of the vehicle's body (canceling vibrations). Thus, ride comfort of the vehicle having the motor-driven wheel mounted thereon and driven by in-wheel motor IWM is thus improved.

FIG. 2 is another schematic cross-sectional view of wheel supporting apparatus 200 and a motor-undriven wheel supported thereby according to the first embodiment. Referring to FIG. 2, motor-undriven wheel 100A includes a wheel disc 10, a wheel hub 20A, a brake rotor 40, a brake caliper 50, a weight WG, and a tire 250. Wheel disc 10, brake rotor 40, brake caliper 50 and tire 250 are those as described above.

Wheel hub 20A is connected to a disc portion 10A of wheel disc 10 with screws 1, 2. Wheel hub 20A has its outer peripheral end connected to the inner peripheral end of brake rotor 40 with screws 3, 4. Wheel hub 20A is rotatably supported on knuckle 180 by means of hub bearings 11, 12.

In a case where wheel supporting apparatus 200 supports motor-undriven wheel 100A on the vehicle's body, dampers 140, 150 are attached to weight WG in the top-bottom direction DR1 of the vehicle's body. Further, wheel supporting apparatus 200 rotatably supports wheel disc 10 and wheel hub 20A by means of upper arm 210, lower arm 220 and knuckle 180 and supports weight WG by means of upper arm 210, lower arm 220 and dampers 140, 150 in such a manner that allows weight WG to vibrate in the top-bottom direction DR1 of the vehicle's body.

When motor-undriven wheel 100A receives vibrations due to road surface conditions for example while the vehicle is running, dampers 140, 150 vibrate weight WG in the top-bottom direction DR1 of the vehicle's body by the vibrations received by motor-undriven wheel 100A. In other words, dampers 140, 150 convert the vibrations received by motor-undriven wheel 100A into the vibrations of weight WG. Dampers 140, 150 thus allow the vibrations received by motor-undriven wheel 100A to be cancelled by weight WG. Specifically, dampers 140, 150 are placed so that the vibrations of motor-undriven wheel 100A and the vibrations of weight WG dampen each other. Accordingly, the vibrations of motor-undriven wheel 100A are hindered from being transmitted via upper arm 210 and lower arm 220 to the vehicle's body.

In this way, the unsprung input from tire 250 is alleviated and thereby ride comfort of the vehicle having motor-undriven wheel 100A mounted thereon is improved.

As discussed above, wheel supporting apparatus 200 supports motor-driven wheel 100 on which in-wheel motor IWM is mounted as well as usual motor-undriven wheel 100A on the vehicle's body, converts vibrations received by motor-driven wheel 100 or motor-undriven wheel 100A into vibrations of in-wheel motor IWM or weight WG by means of dampers 140, 150, and allows the vibrations received by motor-driven wheel 100 or motor-undriven wheel 100A to be cancelled by in-wheel motor IWM or weight WG.

Thus, the vehicle having wheel-supporting apparatus 200 by which motor-driven wheel 100 or motor-undriven wheel 100A is supported can be improved in ride comfort.

According to the present invention, springs having bushings or dampers having a viscous material enclosed therein may be used instead of dampers 140, 150. Namely, according to the present invention, in-wheel motor IWM or weight WG may be supported by elastic bodies or dampers in a manner that allows in-wheel motor IWM or weight WG to vibrate.

Here, wheel disc 10 and wheel hub 20 (or 20A) constitute "wheel".

"Wheel unit" herein refers to motor-driven wheel 100 or motor-undriven wheel 100A.

Dampers 140, 150 constitute "a pair of elastic members". In the first embodiment, the paired elastic members are connected to both of upper arm 210 and lower arm 220.

Further, dampers 140, 150 constitute "elastic members". In the first embodiment, the elastic members are connected to both of upper arm 210 and lower arm 220.

Moreover, damper 140 constitutes "upper elastic member" while damper 150 constitutes "lower elastic member".

In-wheel motor IWM or weight WG constitutes "load member".

Further, knuckle 180 constitutes "rotatably supporting member" that rotatably supports the wheel (wheel disc 10 and wheel hub 20, 20A) of motor-driven wheel 100 or motor-undriven wheel 100A.

Second Embodiment

Figure 4:
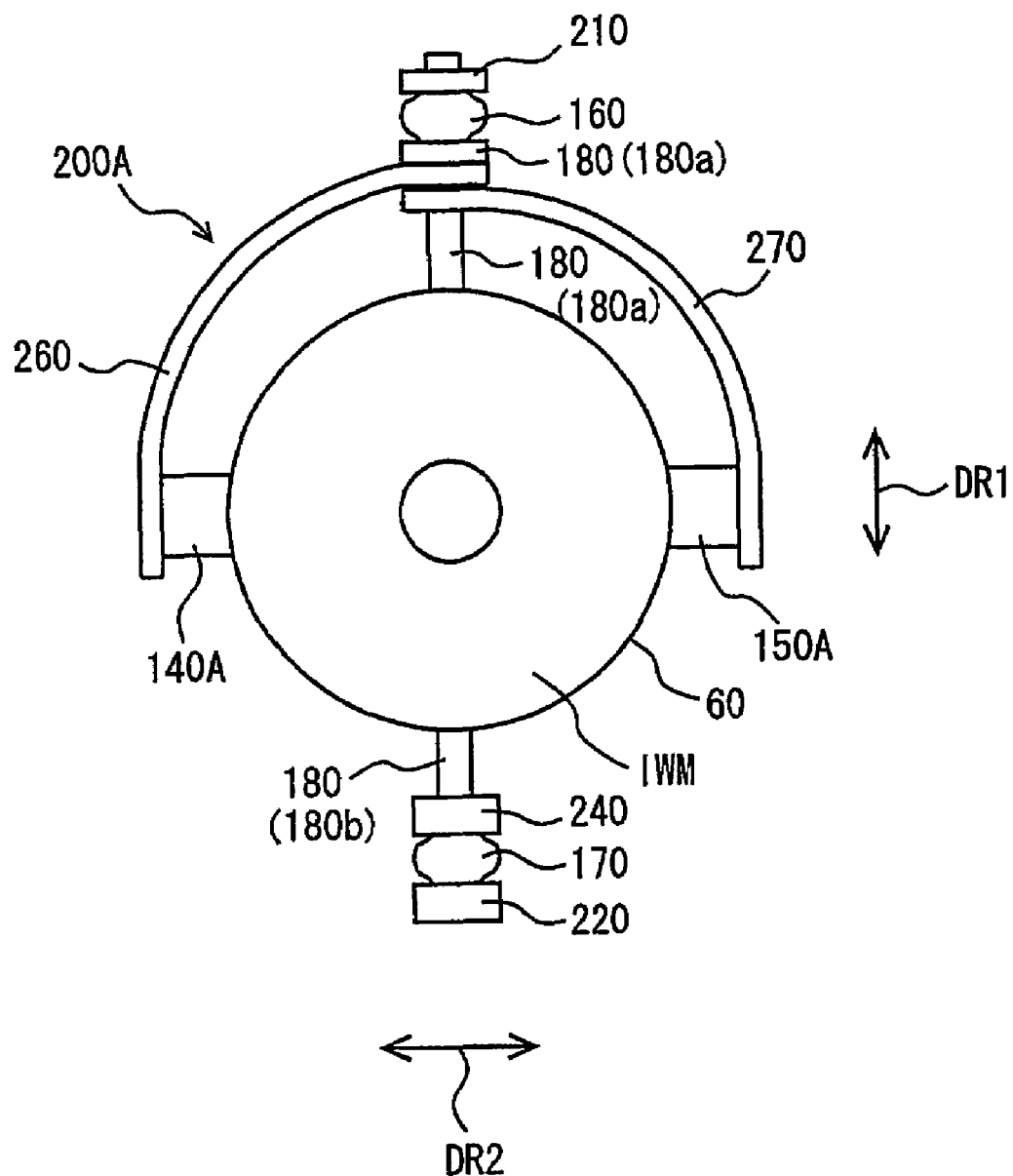
FIG. 4 is a plan view of an in-wheel motor and the wheel supporting apparatus viewed in direction A shown in FIG. 3.
Figure 5:
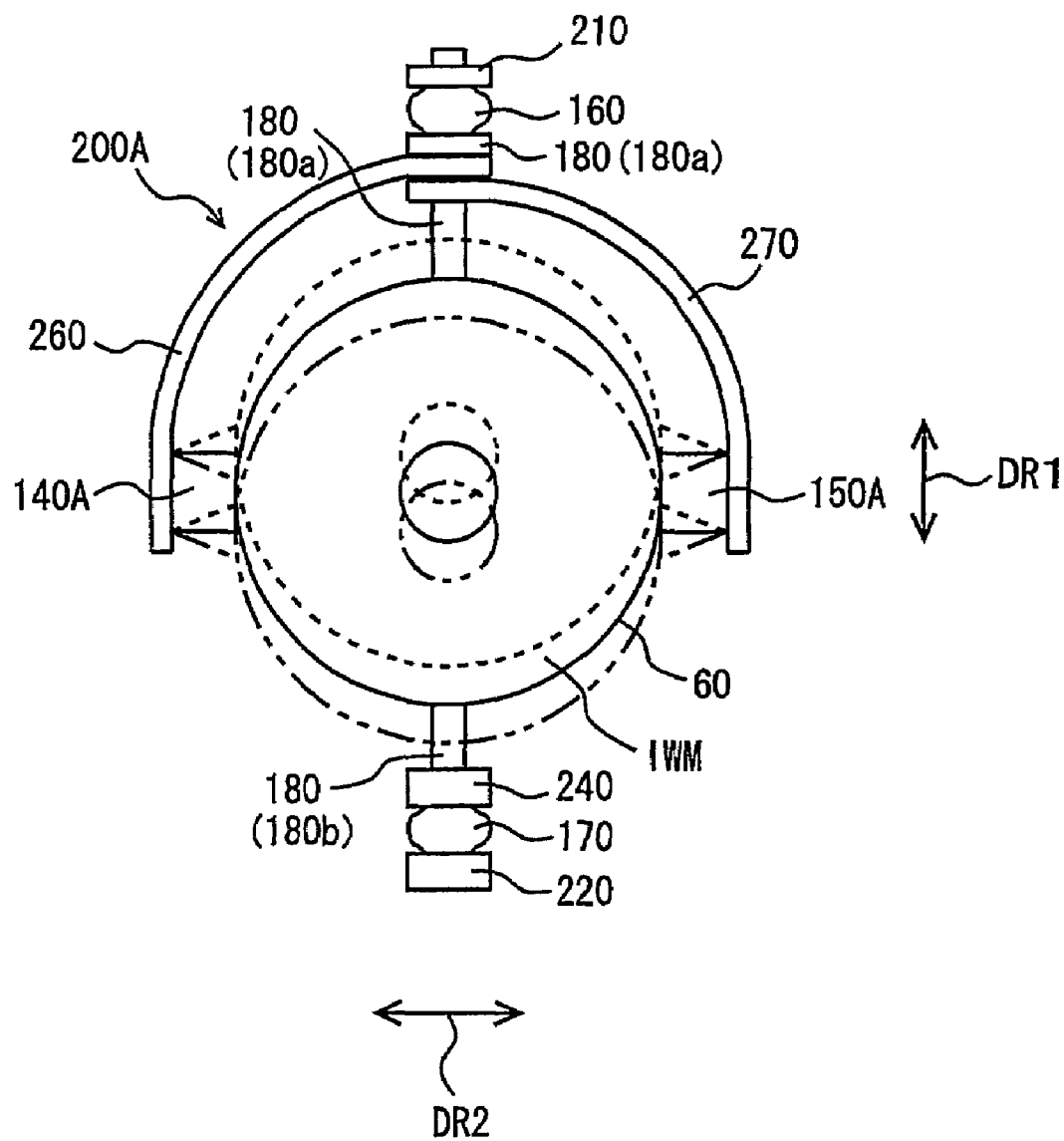
FIG. 5 is a plan view of the in-wheel motor and the wheel supporting apparatus viewed in direction A shown in FIG. 3.

FIG. 3 is a schematic cross-sectional view of a wheel supporting apparatus and a motor-driven wheel supported thereby according to a second embodiment. FIGS. 4 and 5 each show a plan view of in-wheel motor IWM and the wheel supporting apparatus viewed in direction A shown in FIG. 3. FIG. 3 does not show the internal structure of in-wheel motor IWM for making a case 60 more visible.

Referring to FIGS. 3 to 5, wheel supporting apparatus 200A according to the second embodiment is identical to wheel supporting apparatus 200 except that wheel supporting apparatus 200A of the second embodiment includes dampers 140A, 150A instead of dampers 140, 150 of wheel supporting apparatus 200 and additionally includes arms 260, 270.

As dampers 140, 150, dampers 140A, 150A are structured to have rubber in which an oil is enclosed and attached to case 60 of in-wheel motor IWM in the front-rear direction DR2 of the vehicle's body. Arms 260, 270 are placed in the front-rear direction DR2 of the vehicle's body. Arm 260 has one end fixed to damper 140A and the other end connected to ball joint 160. Arm 270 has one end fixed to damper 150A and the other end connected to ball joint 160.

Thus, upper arm 210 is connected to dampers 140A, 150A via ball joint 160 and arms 260, 270. In other words, dampers 140A, 150A are connected to only the upper arm 210 via arms 260, 270 and ball joint 160.

In the second embodiment, ball joint 170 merely connects knuckle 180 (180b), lower arm 220 and link 240 to each other and is not connected to in-wheel motor IWM and dampers 140A, 150A.

When motor-driven wheel 100 vibrates in the top-bottom direction DR1 of the vehicle's body due to road surface conditions for example, dampers 140A, 150A cause in-wheel motor IWM to vibrate in the top-bottom direction DR1 of the vehicle's body by the vibrations of motor-driven wheel 100. In other words, dampers 140A, 150A convert the vibrations of motor-driven wheel 100 into the vibrations of in-wheel motor IWM. Then, dampers 140A, 150A allow the vibrations of motor-driven wheel 100 to be absorbed by in-wheel motor IWM.

Since dampers 140A, 150A are structured to have rubber in which an oil is enclosed, dampers 140A, 150A are deformable in the top-bottom direction DR1 of the vehicle's body. Accordingly, as dampers 140A, 150A receive vibrations of motor-driven wheel 100 via knuckle 180 (180a) and arms 260, 270, dampers 140A, 150A deform as shown in FIG. 5 in the top-bottom direction DR1 of the vehicle's body so that in-wheel motor IWM vibrates in the top-bottom direction DR1 of the vehicle's body.

Thus, even when motor-driven wheel 100 vibrates in the direction (top-bottom direction DR1) substantially perpendicular to the direction in which dampers 140A, 150A are attached (front-rear direction DR2), dampers 140A, 150A can use the vibrations of motor-driven wheel 100 to vibrate in-wheel motor IWM in the top-bottom direction DR1 of the vehicle's body. Consequently, the vibrations of motor-driven wheel 100 are cancelled by in-wheel motor IWM so that the vibrations are hindered from being transmitted via upper arm 210 and lower arm 220 to the vehicle's body. The unsprung input is thus alleviated and accordingly ride comfort of the vehicle is improved.

As discussed above, wheel supporting apparatus 200A rotatably supports wheel disc 10 and wheel hub 20 with upper arm 210, lower arm 220 and knuckle 180 and supports in-wheel motor IWM with upper arm 210, arms 260, 270 and dampers 140A, 150A in such a manner that allows in-wheel motor IWM to vibrate in the top-bottom direction DR1 of the vehicle's body.

Figure 6:
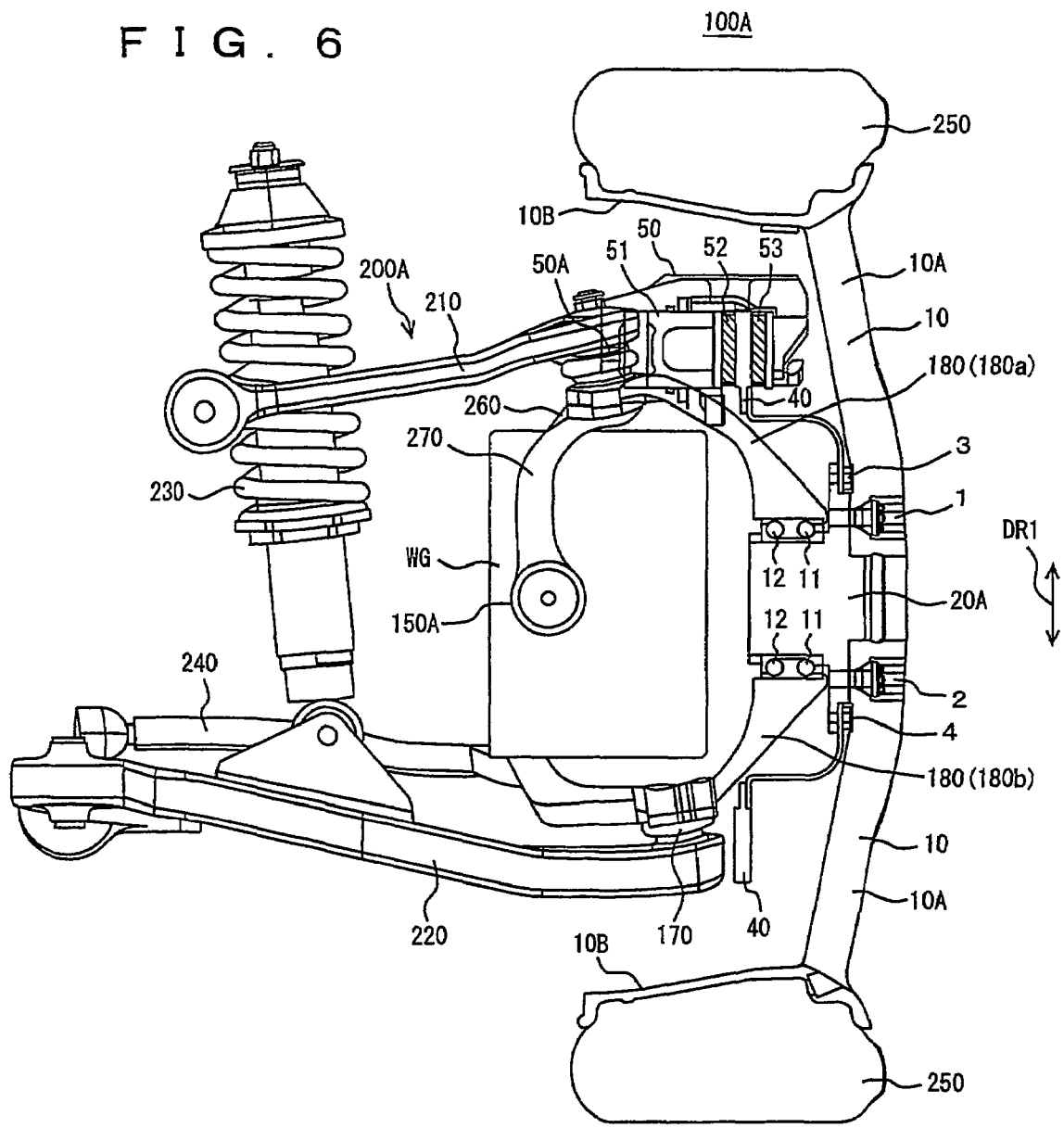
FIG. 6 is another schematic cross-sectional view of the wheel supporting apparatus and a motor-undriven wheel supported thereby according to the second embodiment.

FIG. 6 is another schematic cross-sectional view of wheel supporting apparatus 200A and a motor-undriven wheel supported thereby according to the second embodiment. Referring to FIG. 6, wheel supporting apparatus 200A supports motor-undriven wheel 100A on the vehicle's body. In this case, dampers 140A, 150A are attached to weight WG in the front-rear direction DR2 of the vehicle's body (the direction perpendicular to the plane of FIG. 6). Although damper 140A is not shown in FIG. 6 since damper 140A is located behind weight WG as seen in FIG. 6, dampers 140A, 150A are actually attached to weight WG in the same manner as that shown in FIG. 4. Ball joint 170 is not connected to weight WG and dampers 140A, 150A.

Thus, wheel supporting apparatus 200A rotatably supports wheel disc 10 and wheel hub 20A by means of upper arm 210, lower arm 220 and knuckle 180 and supports weight WG by means of upper arm 210, arms 260, 270 and dampers 140A, 150A in such a manner that allows weight WG to vibrate in the top-bottom direction DR1 of the vehicle's body by the above-described mechanism (see FIG. 5).

When motor-undriven wheel 100A receives vibrations due to road surface conditions for example while the vehicle is running, dampers 140A, 150A vibrate weight WG in the top-bottom direction DR1 of the vehicle's body using the vibrations received by motor-undriven wheel 100A and accordingly allow the vibrations received by motor-undriven wheel 100A to be cancelled by weight WG. The vibrations of motor-undriven wheel 100A are accordingly hindered from being transmitted via upper arm 210 and lower arm 220 to the vehicle's body.

The unsprung input from tire 250 is thus alleviated so that ride comfort of the vehicle is improved.

As discussed above, wheel-supporting apparatus 200A supports motor-driven wheel 100 having in-wheel motor IWM mounted thereon or usual motor-undriven wheel 100A on the vehicle's body, converts vibrations received by motor-driven wheel 100 or motor-undriven wheel 100A into vibrations of in-wheel motor IWM or weight WG by means of dampers 140A, 150A, and allows the vibrations received by motor-driven wheel 100 or motor-undriven wheel 100A to be cancelled by in-wheel motor IWM or weight WG.

Ride comfort of the vehicle having motor-driven wheel 100 or motor-undriven wheel 100A supported by wheel supporting apparatus 200A can thus be improved.

It is described above that dampers 140A, 150A attached to in-wheel motor IWM or weight WG are connected to only upper arm 210 via arms 260, 270 and ball joint 160. However, in the second embodiment, arms 260, 270 may be connected via ball joint 170 to lower arm 220, and dampers 140A, 150A may be connected to only lower arm 220 via arms 260, 270 and ball joint 170. In this case, ball joint 160 is not connected to in-wheel motor IWM or weight WG.

With the above-described arrangement as well, dampers 140A, 150A can vibrate weight WG in the top-bottom direction DR1 of the vehicle's body by vibrations of motor-undriven wheel 100A to allow the vibrations of motor-undriven wheel 100A to be cancelled by in-wheel motor IWM or weight WG.

In other words, in the second embodiment, dampers 140A, 150A may be connected to one of upper arm 210 and lower arm 220 via arms 260, 270.

Dampers 140A, 150A constitute "a pair of elastic members". In the second embodiment, the paired elastic members are connected to one of upper arm 210 and lower arm 220.

Further, dampers 140A, 150A constitute "elastic members". In the second embodiment, the elastic members are connected to one of upper arm 210 and lower arm 220.

Arms 260, 270 constitute "a pair of arm members".

Other specifics of the second embodiment are identical to those of the first embodiment.

As discussed above, wheel supporting apparatus 200 of the first embodiment connects a pair of elastic members (dampers 140, 150) to both of upper arm 210 and lower arm 220 to allow vibrations of motor-driven wheel 100 having in-wheel motor IWM mounted thereon or motor-undriven wheel 100A having weight WG mounted thereon and vibrations of in-wheel motor IWM or weight WG to dampen each other.

Wheel supporting apparatus 200A of the second embodiment connects a pair of elastic members (dampers 140A, 150A) to one of upper arm 210 and lower arm 220 to allow vibrations of motor-driven wheel 100 having in-wheel motor IWM mounted thereon or motor-undriven wheel 100A having weight WG mounted thereon and vibrations of in-wheel motor IWM or weight WG to dampen each other.

Accordingly, regarding the wheel supporting apparatus of the present invention, the pair of elastic members may be connected to at least one of upper arm 210 and lower arm 220 that constitute the suspension arm.

Further, it is described above that a pair of dampers 140, 150 or dampers 140A, 150A are attached to in-wheel motor IWM or weight WG in the top-bottom direction DR1 or front-rear direction DR2 of the vehicle's body. According to the present invention, however, the paired dampers 140, 150 or 140A, 150A may be attached to in-wheel motor IWM or weight WG in an arbitrary direction with which vibrations of motor-driven wheel 100 or motor-undriven wheel 100A can be converted into vibrations of in-wheel motor IWM or weight WG.

Third Embodiment

Figure 7:
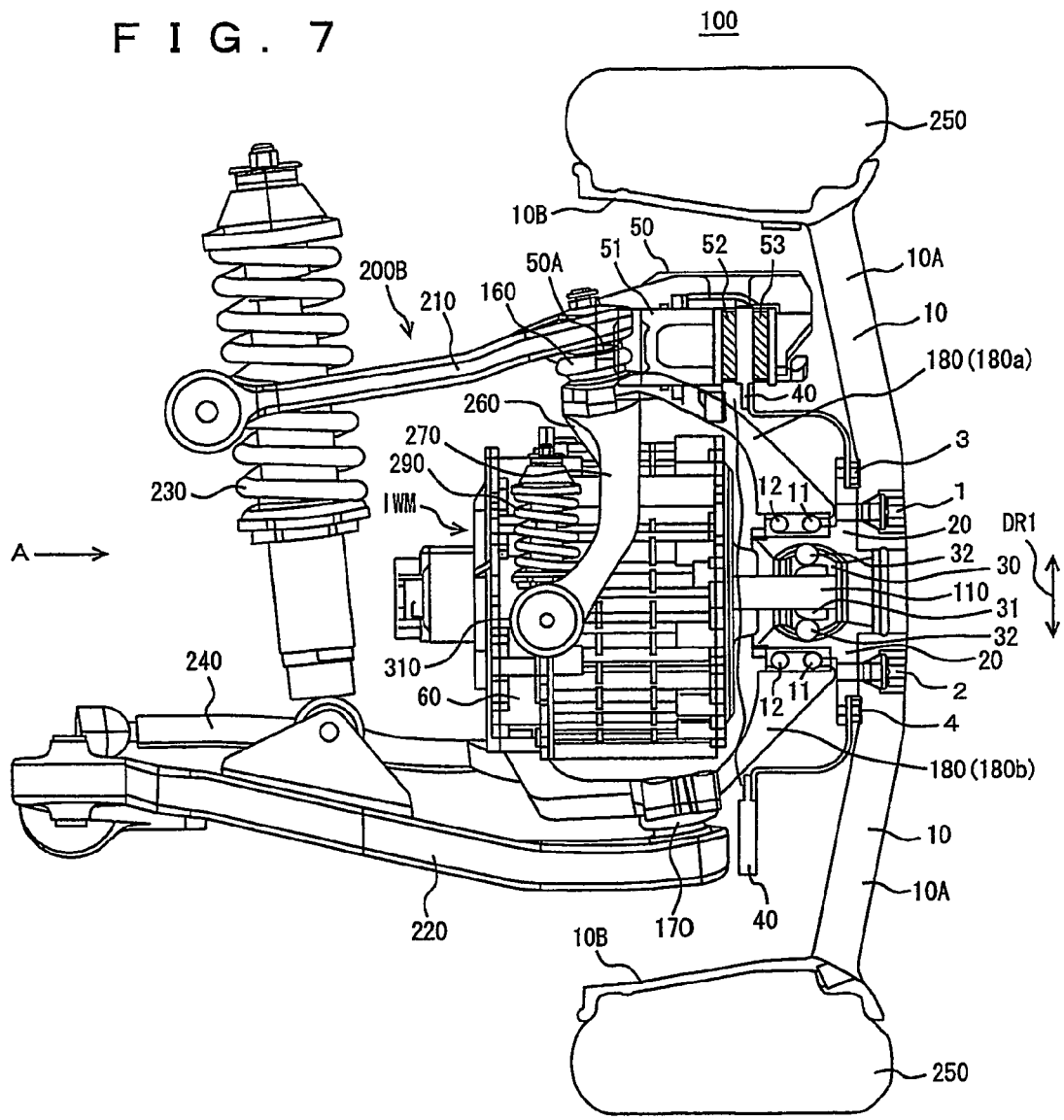
FIG. 7 is a schematic cross-sectional view of a wheel supporting apparatus and a motor-driven wheel supported thereby according to a third embodiment.
Figure 8:
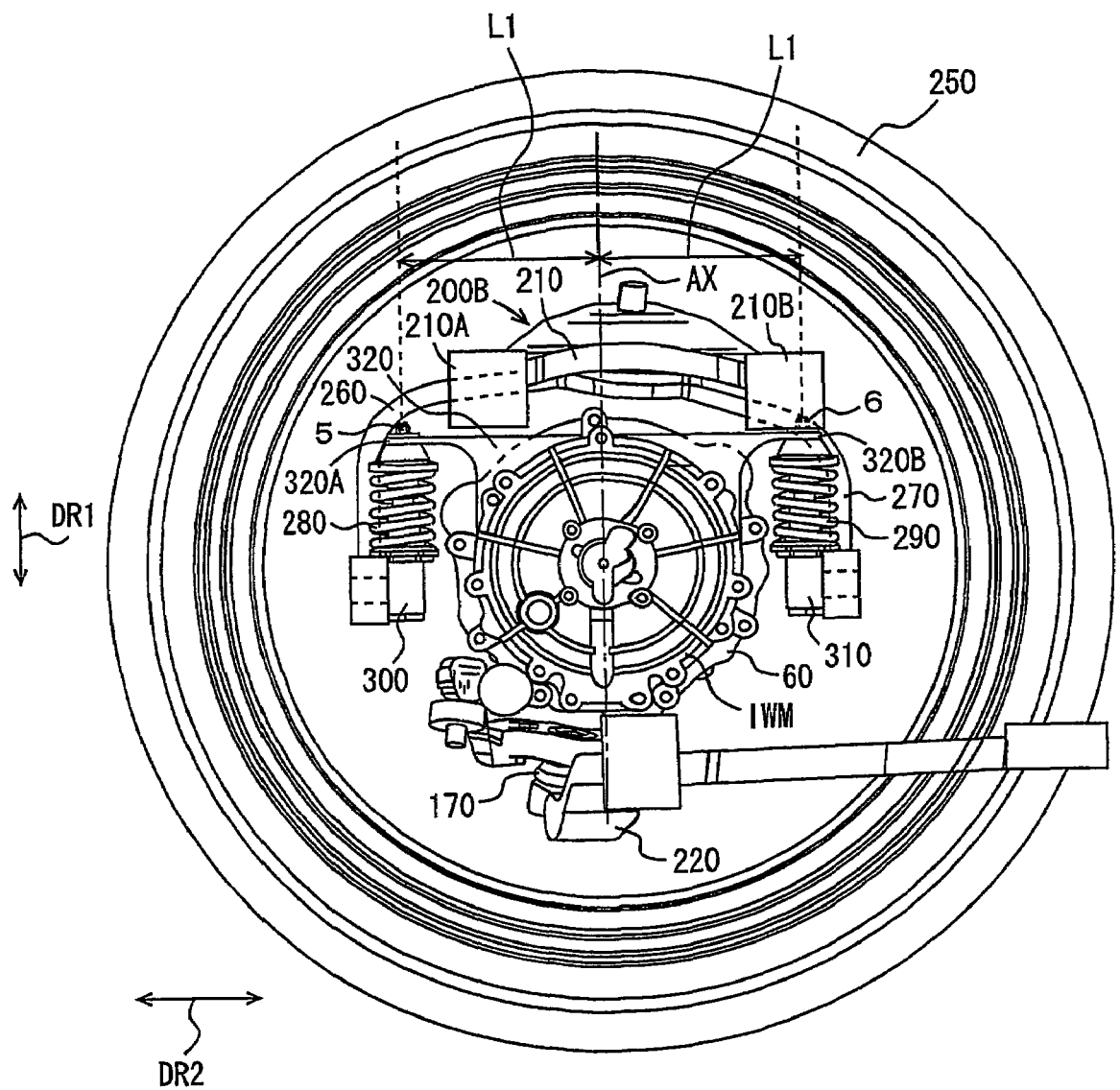
FIG. 8 is a plan view of an in-wheel motor and the wheel supporting apparatus viewed in direction A shown in FIG. 7.

FIG. 7 is a schematic cross-sectional view of a wheel supporting apparatus and a motor-driven wheel supported thereby according to a third embodiment. FIG. 8 is a plan view of in-wheel motor IWM and the wheel supporting apparatus viewed in direction A shown in FIG. 7. Here, as FIG. 3, FIG. 7 does not show the internal structure of in-wheel motor IWM.

Referring to FIGS. 7 and 8, wheel supporting apparatus 200B of the third embodiment is identical to wheel supporting apparatus 200A shown in FIGS. 3-5 except that wheel supporting apparatus 200B additionally includes suspensions 280, 290, absorbers 300, 310 and an extension member 320, and other components thereof are identical to those of wheel supporting apparatus 200A.

Extension member 320 has its central part fixed to in-wheel motor IWM and extends from in-wheel motor IWM in the front-rear direction DR2 of the vehicle's body. Extension member 320 has end portions 320A, 320B, end portion 320A is located closer to the front end of the vehicle's body with respect to in-wheel motor IWM and end portion 320B is located closer to the rear end of the vehicle's body with respect to in-wheel motor IWM.

Absorber 300 is fixed to one end of arm 260. Absorber 310 is fixed to one end of arm 270. Suspension 280 has one end fixed with a screw 5 to end portion 320A of extension member 320 and the other end connected to absorber 300. Further, suspension 290 has one end fixed with a screw 6 to end portion 320B of extension member 320 and the other end connected to absorber 310. In this way, suspensions 280, 290 are placed on respective sides opposite to each other with respect to in-wheel motor IWM in the front-rear direction DR2 of the vehicle's body.

Upper arm 210 is connected via ball joint 160 and arms 260, 270 to absorbers 300, 310 and suspensions 280, 290. In other words, suspensions 280, 290 and absorbers 300, 310 are connected via arms 260, 270 to upper arm 210 only.

The center of extension member 320 in the front-rear direction DR2 of the vehicle's body coincides with an axis AX passing through the center O of in-wheel motor IWM. Distance L1 from axis AX to screw 5 is identical to the distance from axis AX to screw 6.

Distance L1 is determined in consideration of the weight of in-wheel motor IWM and the space within wheel disc 10. Specifically, distance L1 is determined so that arms 260, 270, suspensions 280, 290, absorbers 300, 310 and extension member 320 can be placed within wheel disc 10 and in-wheel motor IWM can be supported by arms 260, 270, suspensions 280, 290, absorbers 300, 310 and extension member 320.

Extension member 320 equally distributes the weight of in-wheel motor IWM to suspensions 280, 290.

Upper arm 210 has two end portions 210A, 210B and is fixed to the vehicle's body pivotably in the top-bottom direction DR1 of the vehicle's body by end portions 210A, 210B.

When motor-driven wheel 100 vibrates due to road surface conditions for example in the top-bottom direction DR1 of the vehicle's body, suspensions 280. 290 and absorbers 300, 310 use the vibrations of motor-driven wheel 100 to vibrate in-wheel motor IWM via extension member 320 in the top-bottom direction DR1 of the vehicle's body. In other words, suspensions 280, 290 and absorbers 300, 310 convert the vibrations of motor-driven wheel 100 into the vibrations of in-wheel motor IWM. Then, suspensions 280, 290 and absorbers 300, 310 allow the vibrations of motor-driven wheel 100 to be absorbed by in-wheel motor IWM.

Suspensions 280, 290 and absorbers 300, 310 can expand or contract in the top-bottom direction DR1 of the vehicle's body. When suspensions 280, 290 and absorbers 300, 310 receive vibrations of motor-driven wheel 100 via knuckle 180 (180a) and arms 260, 270, suspensions 280, 290 and absorbers 300, 310 expand or contract in the top-bottom direction DR1 of the vehicle's body to vibrate in-wheel motor IWM in the top-bottom direction DR1 of the vehicle's body.

Thus, suspensions 280, 290 and absorbers 300, 310 can vibrate in-wheel motor IWM in the top-bottom direction DR1 of the vehicle's body using the vibrations of motor-driven wheel 100 even when motor-driven wheel 100 vibrates in the top-bottom direction DR1. Consequently, the vibrations of motor-driven wheel 100 are cancelled by in-wheel motor IWM so that the vibrations are hindered from being transmitted via upper arm 210 and lower arm 220 to the vehicle's body. Then, the unsprung input is alleviated and ride comfort of the vehicle is improved.

In this case, since suspensions 280, 290 have a larger stroke at which they expand or contract in the top-bottom direction DR1 of the vehicle's body as compared with such an elastic mount as engine mount, suspensions 280, 290 can effectively alleviate the unsprung input due to vibrations of motor-driven wheel 100. Accordingly, ride comfort of the vehicle having motor-driven wheel 100 supported by wheel supporting apparatus 200B can further be improved.

As discussed above, wheel supporting apparatus 200B rotatably supports wheel disc 10 and wheel hub 20 by means of upper arm 210, lower arm 220 and knuckle 180 and supports in-wheel motor IWM by means of upper arm 210, arms 260, 270, absorbers 300, 310 and suspensions 280, 290 in such a manner that allows in-wheel motor IWM to vibrate in the top-bottom direction DR1 of the vehicle's body.

Wheel supporting apparatus 200B may support weight WG of motor-undriven wheel 100A (see FIGS. 2 and 6) instead of in-wheel motor IWM in such a manner that allows weight WG to vibrate in the top-bottom direction DR1 of the vehicle's body. In this case, extension member 320 is fixed to weight WG in the same manner as that shown in FIG. 8. In other words, in-wheel motor IWM in FIG. 8 may be replaced with weight WG. Ball joint 170 is not connected to weight WG.

Accordingly, wheel supporting apparatus 200B rotatably supports wheel disc 10 and wheel hub 20A by means of upper arm 210, lower arm 220 and knuckle 180 and supports weight WG by means of upper arm 210, arms 260, 270, absorbers 300, 310 and suspensions 280, 290 in such a manner that allows weight WG to vibrate in the top-bottom direction DR1 of the vehicle's body.

When motor-undriven wheel 100A receives vibrations due to road surface conditions for example while the vehicle is running, suspensions 280, 290 and absorbers 300, 310 vibrate weight WG in the top-bottom direction DR1 of the vehicle's body using the vibrations received by motor-undriven wheel 100A to allow the vibrations received by motor-undriven wheel 100A to be cancelled by weight WG. Then, the vibrations of weight WG are hindered from being transmitted via upper arm 210 and lower arm 220 to the vehicle's body.

Thus, the unsprung input from tire 250 is alleviated and ride comfort of the vehicle is improved.

As discussed above, wheel supporting apparatus 200B supports motor-driven wheel 100 having in-wheel motor IWM mounted thereon as well as usual motor-undriven wheel 100A on the vehicle's body, converts vibrations received by motor-driven wheel 100 or motor-undriven wheel 100A into vibrations of in-wheel motor IWM or weight WG by means of suspensions 280, 290 and absorbers 300, 310, and allows the vibrations received by motor-driven wheel 100 or motor-undriven wheel 100A to be cancelled by in-wheel motor IWM or weight WG.

Accordingly, ride comfort of the vehicle having motor-driven wheel 100 or motor-undriven wheel 100A supported by wheel supporting apparatus 200B can be improved.

It is described above that suspensions 280, 290 and absorbers 300, 310 attached to in-wheel motor IWM or weight WG are connected to only upper arm 210 via arms 260, 270 and ball joint 160. In the third embodiment, however, arms 260, 270 may be connected via ball joint 170 to lower arm 220, suspensions 280, 290 and absorbers 300, 310 may be connected to only lower arm 220 via arms 260, 270 and ball joint 170. In this case, ball joint 160 is not connected to in-wheel motor IWM or weight WG.

With the above-described arrangement as well, suspensions 280, 290 and absorbers 300, 310 can vibrate in-wheel motor IWM or weight WG in the top-bottom direction DR1 of the vehicle's body by the vibrations of motor-driven wheel 100 or motor-undriven wheel 100A and allow the vibrations of motor-driven wheel 100 or motor-undriven wheel 100A to be cancelled by in-wheel motor IWM or weight WG.

In other words, according to the third embodiment, suspensions 280, 290 and absorbers 300, 310 may be connected via arms 260, 270 to one of upper arm 210 and lower arm 220.

Here, suspensions 280, 290 and absorbers 300, 310 constitute "a pair of elastic members". In the third embodiment, the paired elastic members are connected to one of upper arm 210 and lower arm 220.

Suspensions 280, 290 constitute "a pair of suspensions".

Figure 9:
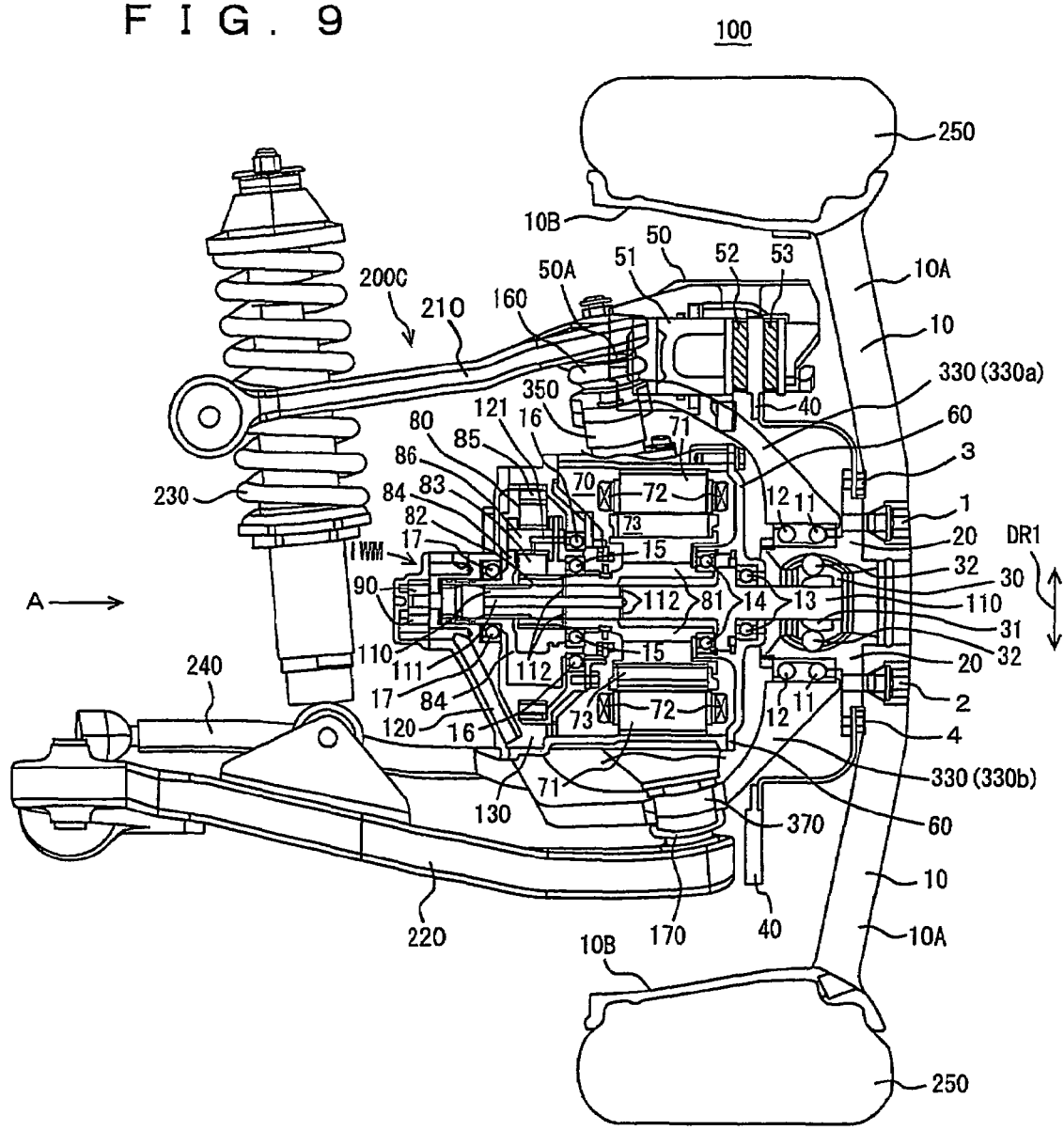
FIG. 9 is a schematic cross-sectional view of a wheel supporting apparatus and a motor-driven wheel supported thereby according to a fourth embodiment.
Figure 10:
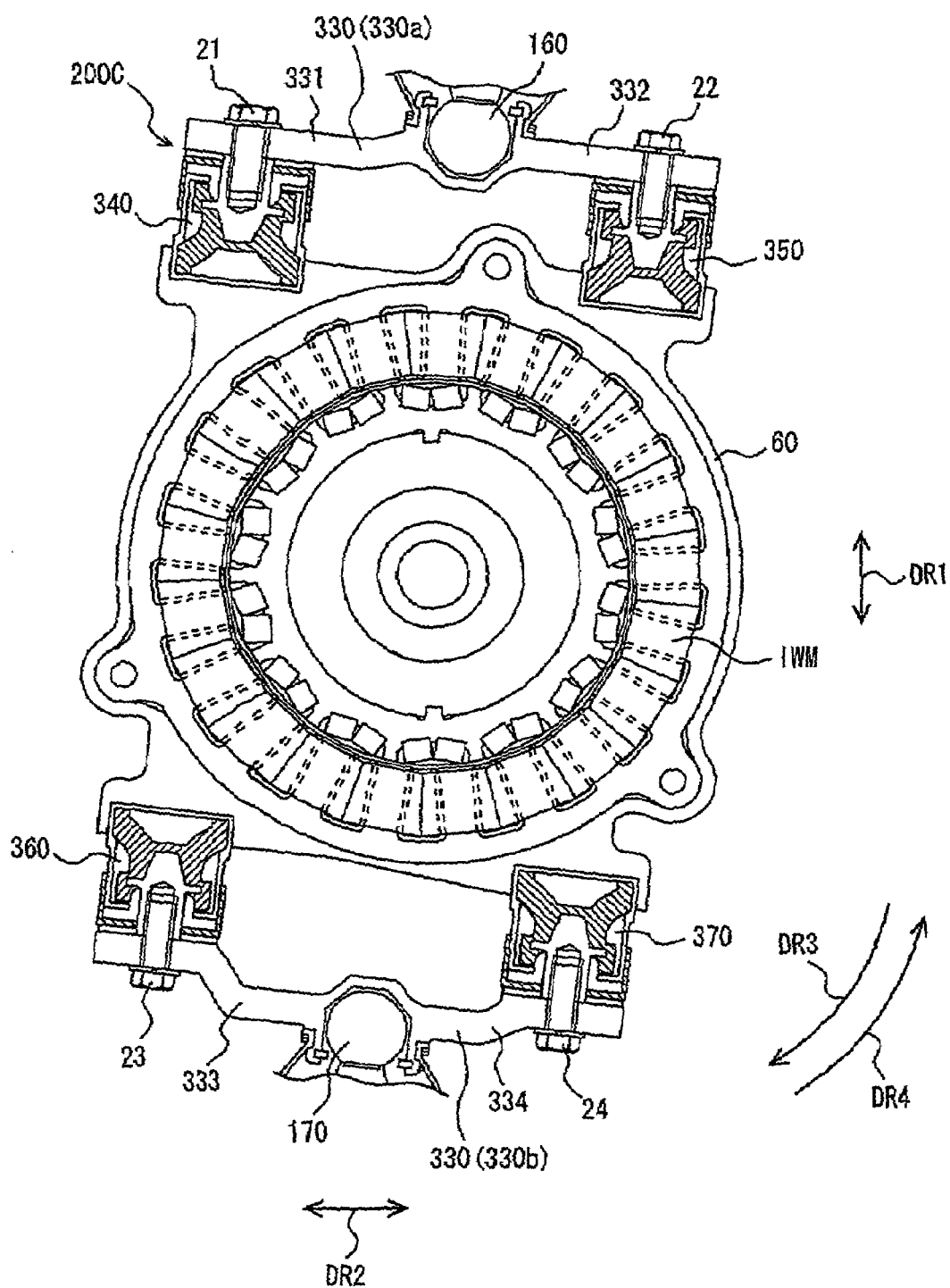
FIG. 10 is a plan view of an in-wheel motor and the wheel supporting apparatus viewed in direction A shown in FIG. 9.

Other specifics of the third embodiment are identical to those of the first and second embodiment, Fourth Embodiment FIG. 9 is a schematic cross-sectional view of a wheel supporting apparatus and a motor-driven wheel supported thereby according to a fourth embodiment. FIG. 10 is a plan view of in-wheel motor IWM and the wheel supporting apparatus viewed in direction A shown in FIG. 9.

Referring to FIGS. 9 and 10, wheel supporting apparatus 200C of the fourth embodiment is identical to wheel supporting apparatus 200 except that wheel supporting apparatus 200C includes a knuckle 330 instead of knuckle 180 of wheel supporting apparatus 200 and rubber mounts 340, 350, 360, 370 instead of dampers 140, 150. Other components of wheel supporting apparatus 200C are thus identical to those of wheel supporting apparatus 200.

Knuckle 330 (330*a*) has one end connected to ball joint 160 and the other end connected to hub bearings 11, 12. Further, knuckle 330 (330*b*) has one end connected to ball joint 170 and the other end connected to hub bearings 11, 12.

The end of knuckle 330 (330*a*) connected to ball joint 160 has arms 331, 332 extending in the front-rear direction DR2 of the vehicle's body and the end of knuckle 330 (330*b*) connected to ball joint 170 has arms 333, 334 extending in the front-rear direction DR2 of the vehicle's body.

Rubber mount 340 is fixed to case 60 and connected to arm 331 of knuckle 330 (330*a*) with a screw 21. Rubber mount 350 is fixed to case 60 and connected to arm 332 of knuckle 330 (330*a*) with a screw 22.

Rubber mount 360 is fixed to case 60 and connected to arm 333 of knuckle 330 (330*b*) with a screw 23. Rubber mount 370 is fixed to case 60 and connected to arm 334 of knuckle 330 (330*b*) with a screw 24.

Rubber mounts 340, 350 are placed in the front-rear direction DR2 of the vehicle's body and rubber mounts 360, 370 are also placed in the front-rear direction DR2 of the vehicle's body. Rubber mounts 340, 350, 360 and 370 are each deformable in the top-bottom direction DR1 of the vehicle's body.

Wheel supporting apparatus 200C supports motor-driven wheel 100 on the vehicle's body by fixing rubber mounts 340, 350, 360, 370 on four corners respectively of case 60 of in-wheel motor IWM and connecting suspension arms (upper arm 210 and lower arm 220) to knuckle 330 and rubber mounts 340, 350, 360, 370 by means of ball joints 160, 170.

Specifically, wheel supporting apparatus 200C rotatably supports wheel disc 10 and wheel hub 20 by means of upper arm 210, lower arm 220 and knuckle 330 and supports in-wheel motor IWM by means of upper arm 210, lower arm 220, knuckle 330 and rubber mounts 340, 350, 360, 370 in such a manner that allows in-wheel motor IWM to vibrate in the top-bottom direction DR1 of the vehicle's body.

When motor-driven wheel 100 is rotated in a rotational direction DR3 by torque output from in-wheel motor IWM in-wheel motor IWM is subjected to counter-rotational force in a rotational direction DR4. Wheel supporting apparatus 200C supports the four corners of in-wheel motor IWM with four rubber mounts 340, 350, 360, 370 as described above. Therefore, wheel supporting apparatus 200C can work against the counter-rotational force caused by the rotation of motor-driven wheel 100. Thus, no component is necessary that is dedicated to the purpose of stopping the counter-rotational force due to the rotation of motor-driven wheel 100, which means that the cost can be reduced.

When motor-driven wheel 100 receives vibrations in the top-bottom direction DR1 of the vehicle's body due to road surface conditions while the vehicle is running, rubber mounts 340, 350, 360, 370 are deformed in the top-bottom direction DR1 of the vehicle's body by in-wheel motor IWM (motor 70) that serves as a damper mass to generate vibrations in the top-bottom direction DR1 of the vehicle's body of in-wheel motor IWM (motor 70) so that the vibrations of in-wheel motor IWM (motor 70) are out of phase from the vibrations received by motor-driven wheel 100. In other words, rubber mounts 340, 350, 360, 370 convert the vibrations of motor-driven wheel 100 into the vibrations of motor 70. Then, rubber mounts 340, 350, 360, 370 allow the vibrations received by motor-driven wheel 100 to be cancelled by in-wheel motor IWM. Specifically, rubber mounts 340, 350, 360, 370 are placed so that the vibrations of motor-driven wheel 100 and the vibrations of motor 70 dampen each other. Accordingly, the vibrations of motor-driven wheel 100 are hindered from being transmitted via upper arm 210 and lower arm 220 to the vehicle's body.

In this way, the unsprung input from tire 250 is alleviated. Namely, a part of vibrations that cannot be absorbed by shock absorber 230 is absorbed. Ride comfort of the vehicle is thus improved.

Further, wheel supporting apparatus 200C suppresses rotations of in-wheel motor IWM itself against the counter-rotational force due to the rotations of motor-driven wheel 100.

It is described above that two rubber mounts 340, 350 are placed on the upper side of in-wheel motor IWM in the top-bottom direction DR1 of the vehicle's body and two rubber mounts 360, 370 are placed on the lower side of in-wheel motor IWM. The present invention, however, is not limited to the above-described arrangement. Specifically, the number of rubber mounts provided on one of the upper side and the lower side of in-wheel motor IWM may be one. In this case, one rubber mount is provided between ball joint 160 and in-wheel motor IWM or between in-wheel motor IWM and ball joint 170.

Further, according to the present invention, the number of rubber mounts provided on the upper side and that provided on the lower side of in-wheel motor IWM in the top-bottom direction DR1 of the vehicle's body may not be equal to each other.

Thus, according to the present invention, at least one rubber mount may be provided on each of the upper side and the lower side of in-wheel motor IWM in the top-bottom direction DR1 of the vehicle's body. When a plurality of rubber mounts are provided on one of the upper side and the lower side of in-wheel motor IWM, it is possible to work against the counter-rotational force due to rotations of motor-driven wheel 100.

Figure 11:
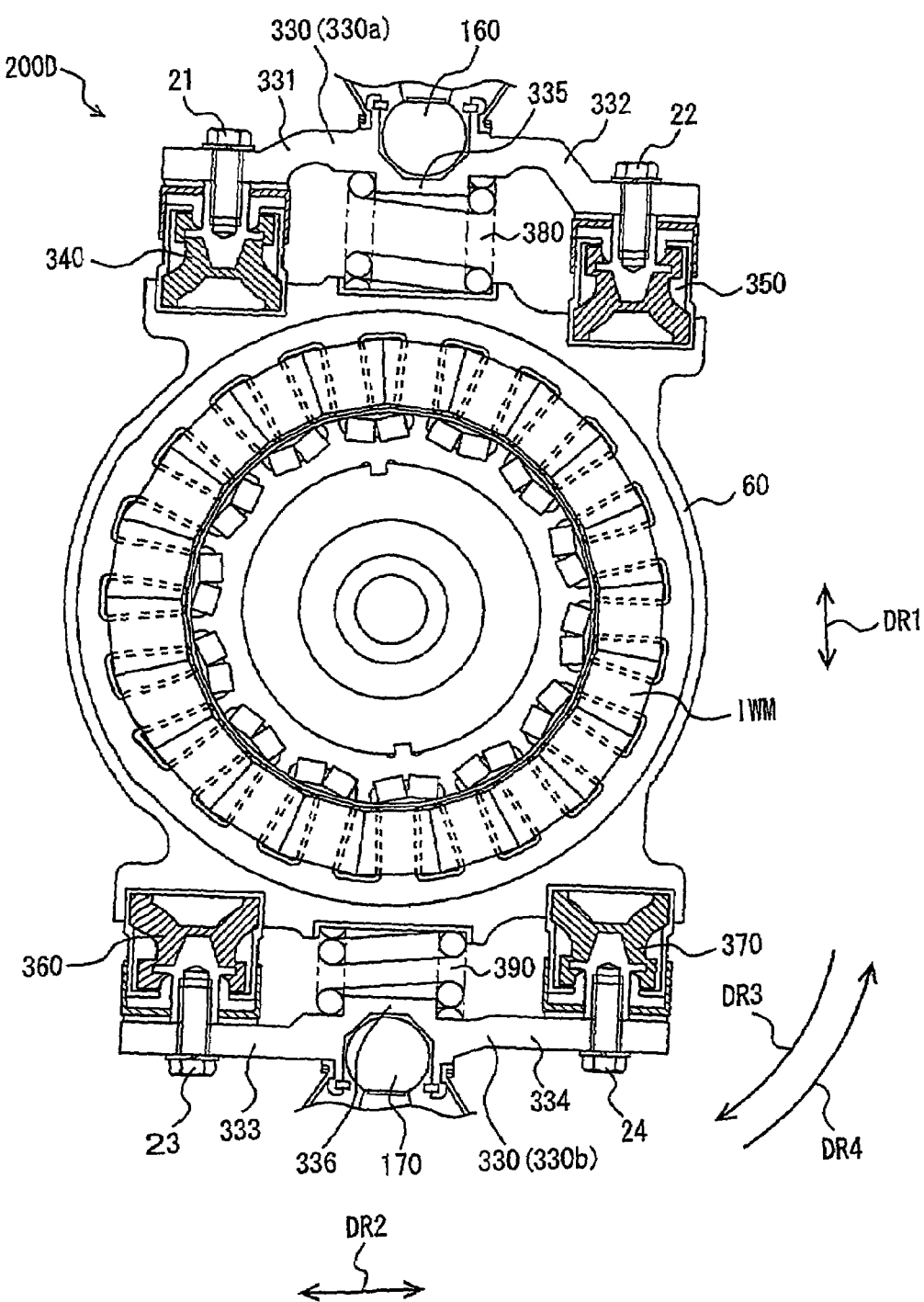
FIG. 11 is another plan view of a wheel supporting apparatus according to the fourth embodiment.

The wheel supporting apparatus of the fourth embodiment may be a wheel supporting apparatus as shown in FIG. 11. FIG. 11 is another plan view of the wheel supporting apparatus according to the fourth embodiment. Referring to FIG. 11, wheel supporting apparatus 200D of the fourth embodiment is identical to wheel supporting apparatus 200C except that wheel supporting apparatus 200D additionally includes springs 380, 390.

Spring 380 has one end fixed to a connecting portion 335 between knuckle 330 (330a) and ball joint 160 and the other end fixed to case 60. Spring 390 has one end fixed to a connecting portion 336 between knuckle 330 (330b) and ball joint 170 and the other end fixed to case 60. Springs 380, 390 expand and contract in the top-bottom direction DR1 of the vehicle's body.

Wheel supporting apparatus 200D supports motor-driven wheel 100 on the vehicle's body by fixing rubber mounts 340, 350, 360, 370 on four corners respectively of case 60 of in-wheel motor IWM, fixing springs 380, 390 to case 60 between rubber mounts 340, 350 and rubber mounts 360, 370 respectively and connecting suspension arms (upper arm 210, lower arm 220) to knuckle 330, rubber mounts 340, 350, 360, 370 and springs 380, 390 by means of ball joints 160, 170.

Specifically, wheel supporting apparatus 200D rotatably supports wheel disc 10 and wheel hub 20 by means of upper arm 210, lower arm 220 and knuckle 330, and supports in-wheel motor IWM by means of upper arm 210, lower arm 220, knuckle 330, rubber mounts 340, 350, 360, 370 and springs 380, 390 in such a manner that allows in-wheel motor IWM to vibrate in the top-bottom direction DR1 of the vehicle's body.

Further, with the same mechanism as that of wheel supporting apparatus 200C, wheel supporting apparatus 200D works against the counter-rotational force due to rotations of motor-driven wheel 100.

When motor-driven wheel 100 receives vibrations in the top-bottom direction DR1 of the vehicle's body due to road surface conditions for example while the vehicle is running, rubber mounts 340, 350, 360, 370 are deformed in the top-bottom direction DR1 of the vehicle's body by in-wheel motor IWM (motor 70) serving as a damper mass, so that springs 380, 390 expand and contract in the top-bottom direction DR1 of the vehicle's body to generate vibrations in the top-bottom direction DR1 of the vehicle's body of in-wheel motor IWM (motor 70) that are out of phase from the vibrations received by motor-driven wheel 100. In other words, rubber mounts 340, 350, 360, 370 and springs 380, 390 convert the vibrations of motor-driven wheel 100 into the vibrations of motor 70. Thus, rubber mounts 340, 350, 360, 370 and springs 380, 390 allow the vibrations received by motor-driven wheel 100 to be cancelled by in-wheel motor IWM. Accordingly, the vibrations of motor-driven wheel 100 are hindered from being transmitted via upper arm 210 and lower arm 220 to the vehicle's body.

In this way, the unsprung input from tire 250 is alleviated. Namely, a part of vibrations that cannot be absorbed by shock absorber 230 is absorbed. Ride comfort of the vehicle is thus improved.

Further, wheel supporting apparatus 200D suppresses rotations of in-wheel motor IWM itself against the counter-rotational force due to the rotations of motor-driven wheel 100.

Since wheel supporting apparatus 200D supports in-wheel motor IWM by means of rubber mounts 340, 350, 360, 370 and springs 380, 390, it can still support in-wheel motor IWM even if rubber mounts 340, 350, 360, 370 deteriorate with time or deteriorate due to ambient temperature, by means of springs 380, 390.

Regarding wheel supporting apparatus 200D, rubber mounts 340, 350, 360, 370 may be replaced with springs 380, 390. Specifically, springs may be fixed between the four corners of in-wheel motor IWM and knuckle 330 and rubber mounts may be fixed between connecting portion 335 of knuckle 330 (330a) and case 60 and between connecting portion 336 of knuckle 330 (330b) and case 60.

It is described above that wheel supporting apparatuses 200C, 200D support in-wheel motor IWM in such a manner that allows in-wheel motor IWM to vibrate in the top-bottom direction DR1 of the vehicle's body. The present invention, however, is not limited to the above-described arrangement. Specifically, according to the present invention, wheel supporting apparatuses 200C, 200D may support weight WG of motor-undriven wheel 100A instead of in-wheel motor IWM in such a manner that allows weight WG to vibrate in the top-bottom direction DR1 of the vehicle's body.

Further, it is described above that springs are placed on the upper side and the lower side of in-wheel motor IWM in the top-bottom direction DR1 of the vehicle's body. According to the present invention, however, a spring may be provided on one of the upper side and the lower side of in-wheel motor IWM.

Rubber mounts 340, 350, 360, 370 constitute "a pair of elastic members".

Further, rubber mounts 340, 350, 360, 370 constitute "elastic members".

Moreover, rubber mounts 340, 360 constitute "a pair of front elastic members" connected to upper arm 210 and lower arm 220 and attached to a load member (in-wheel motor IWM or weight WG) in the top-bottom direction DR1 of the vehicle's body, and rubber mounts 350, 370 constitute "a pair of rear elastic members" connected to upper arm 210 and lower arm 220 and attached to the load member (in-wheel motor IWM or weight WG) in the top-bottom direction DR1 of the vehicle's body. The pair of front elastic members and the pair of rear elastic members are placed in the front-rear direction DR2 of the vehicle's body.

Springs 380, 390 constitute "a pair of middle elastic members" connected to upper arm 210 and lower arm 220 and attached to the load member (in-wheel motor IWM or weight WG) in the top-bottom direction DR1 of the vehicle's body. The paired middle elastic members are placed between the paired front elastic members and the paired rear elastic members in the front-rear direction DR2 of the vehicle's body.

Further, rubber mounts 340, 350 constitute "upper elastic member" and rubber mounts 360, 370 constitute "lower elastic member".

Moreover, rubber mount 340, 350 and spring 380 constitute "upper elastic member" and rubber mounts 360, 370 and spring 390 constitute "lower elastic member".

Moreover, rubber mounts 340, 350, 360, 370 constitute "at least one elastic body" or "at least one first elastic body" and springs 380, 390 constitute "second elastic body".

Other specifics are identical to those of the first embodiment.

Fifth Embodiment

Figure 12:
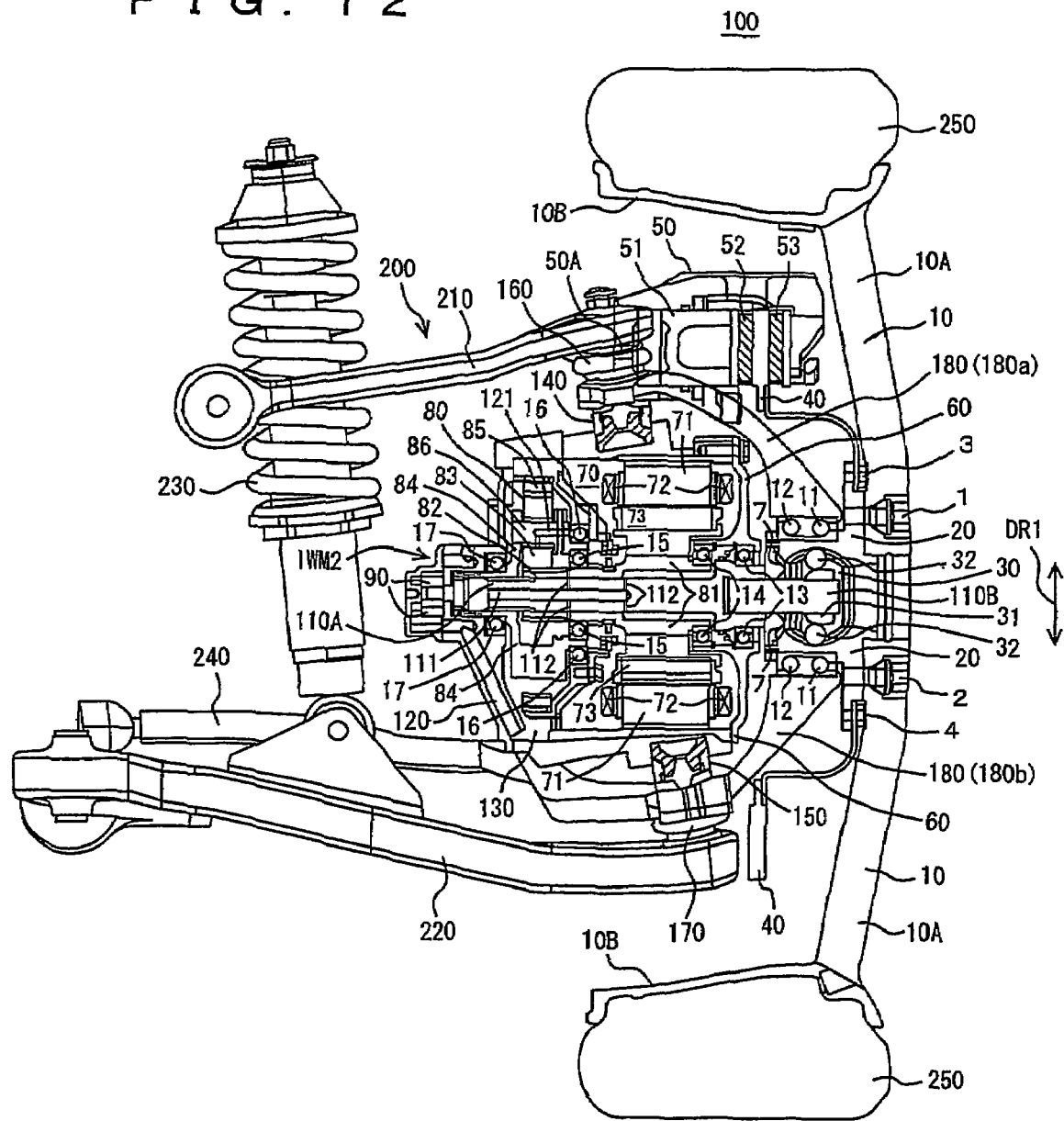
FIG. 12 is another schematic cross-sectional view of an in-wheel motor supported by the wheel supporting apparatus shown in FIG. 1.

FIG. 12 is another cross-sectional view of an in-wheel motor supported by wheel supporting apparatus 200 shown in FIG. 1. Referring to FIG. 12, in-wheel motor IWM2 includes shafts 110A, 110B instead of shaft 110 of in-wheel motor IWM and other specifics of in-wheel motor IWM2 are identical to those of in-wheel motor IWM.

As shaft 110, into one end of shaft 110A, planetary carrier 84 is spline-fitted and shaft 110B is spline-fitted into the other end of shaft 110A. Shaft 110A is rotatably supported by bearings 13, 17. Further, shaft 110A includes oil paths 111, 112 therein as shaft 110.

One end of shaft 110B is spline-fitted into shaft 110A, and inner 31 of constant velocity joint 30 is spline-fitted into the other end of shaft 110B. In this case, a boot 7 is provided between shaft 110B and wheel hub 20. Boot 7 serves to prevent foreign matters from entering constant velocity joint 30 and prevent grease supplied to constant velocity joint 30 from flowing out of joint 30.

Shaft 110A receives torque output from motor 70 via planetary gear 80 and outputs the torque to wheel hub 20 and wheel disc 10 via shaft 110B and constant velocity joint 30. Wheel hub 20 and wheel disc 10 are thus rotated at a predetermined number of revolutions.

By dividing the shaft of in-wheel motor IWM2 into two shafts 110A, 110B, fabrication of the parts of motor-driven wheel 100 is facilitated. Specifically, in assembling motor-driven wheel 100, wheel hub 20 having shaft 110B integrated into constant velocity joint 30 may be fixed to wheel disc 10, boot 7 may be provided between shaft 110B and wheel hub 20 and thereafter in-wheel motor IWM2 may be attached to enable spline-fitting between shafts 110A and shaft 110B. In this way, fabrication of shafts 110A, 110B is facilitated.

Wheel supporting apparatus 200 shown in FIG. 1 supports in-wheel motor IWM2 described above in such a manner that allows in-wheel motor IWM2 to vibrate in the top-bottom direction DR1 of the vehicle's body, converts vibrations of motor-driven wheel 100 in the top-bottom direction DR1 of the vehicle's body into vibrations of in-wheel motor IWM2 in the top-bottom direction DR1 of the vehicle's body, and hinders the unsprung input from being transmitted via upper arm 210 and lower arm 220 to the vehicle's body.

Further, according to the fifth embodiment, in-wheel motor IWM2 may be supported in such a manner that allows in-wheel motor IWM2 to vibrate in the top-bottom direction DR1 of the vehicle's body by means of any of wheel supporting apparatuses 200A, 200, 200C and 200D.

Here, shafts 110A, 110B constitute "motor output shaft".

Shaft 110A constitutes "first output shaft" and shaft 110B constitutes "second output shaft".

Other specifics are identical to those of the first to fourth embodiments.

INDUSTRIAL APPLICABILITY

The present invention is applied to wheel supporting apparatuses that can improve ride comfort of vehicles.

The invention claimed is:

1. A wheel supporting apparatus comprising:
an elastic member attached to a load member provided in a wheel of a wheel unit and placed to allow vibrations of said wheel unit and vibrations of said load member to dampen each other;
a suspension arm having one end connected to said elastic member and the other end fixed to a vehicle body pivotably in a top-bottom direction of said vehicle body; and
a rotatably supporting member connected to said suspension arm and said elastic member to rotatably support said wheel.

2. The wheel supporting apparatus according to claim 1, wherein
said load member is an in-wheel motor including:
a motor generating motive power;
a motor output shaft connected to said wheel via a constant velocity joint to allow the motive power generated by said motor to be transmitted to said wheel; and
a case housing said motor, and
said elastic member is attached to said case.

3. The wheel supporting apparatus according to claim 2, wherein
said motor output shaft is comprised of:
a first output shaft connected to said motor; and
a second output shaft having one end fitted into said first output shaft and the other end connected to said constant velocity joint.

4. The wheel supporting apparatus according to claim 1, wherein
said load member is a weight provided to said wheel without connected to said wheel.

5. The wheel supporting apparatus according to claim 1, wherein
said suspension arm is comprised of an upper arm and a lower arm, and
said elastic member is connected to at least one of said upper arm and said lower arm.

6. The wheel supporting apparatus according to claim 5, wherein
said elastic member is comprised of a pair of elastic members,
one of said pair of elastic members is connected to said upper arm, and
the other of said pair of elastic members is connected to said lower arm.

7. The wheel supporting apparatus according to claim 6, wherein
said pair of elastic members is connected to said load member in the top-bottom direction of said vehicle body, and
said upper arm and said lower arm are connected to said pair of elastic members in the top-bottom direction of said vehicle body.

8. The wheel supporting apparatus according to claim 7, wherein
said pair of elastic members is comprised of:
a pair of front elastic members connected to said upper arm and said lower arm and attached to said load member in the top-bottom direction of said vehicle body; and
a pair of rear elastic members connected to said upper arm and said lower arm and attached to said load member in the top-bottom direction of said vehicle body, and
said pair of front elastic members and said pair of rear elastic members are placed in a front-rear direction of said vehicle body.

9. The wheel supporting apparatus according to claim 8, wherein
said pair of front elastic members and said pair of rear elastic members are each a rubber mount.

10. The wheel supporting apparatus according to claim 8, wherein
said pair of elastic members further includes a pair of middle elastic members connected to said upper arm and said lower arm and attached to said load member in the top-bottom direction of said vehicle body, and
said pair of middle elastic members is made of a material different from a material of which said pair of front elastic members and said pair of rear elastic members are made and is placed between said pair of front elastic members and said pair of rear elastic members in the front-rear direction of said vehicle body.

11. The wheel supporting apparatus according to claim 10, wherein
said pair of front elastic members and said pair of rear elastic members are each comprised of a rubber mount, and
said pair of middle elastic members is each comprised of a spring.

12. The wheel supporting apparatus according to claim 10, wherein
said pair of front elastic members and said pair of rear elastic members are each comprised of a spring, and
said pair of middle elastic members is each comprised of a rubber mount.

13. The wheel supporting apparatus according to claim 5, wherein
said elastic member is comprised of an upper elastic member and a lower elastic member,
said upper elastic member is connected to said upper arm, and
said lower elastic member is connected to said lower arm.

14. The wheel supporting apparatus according to claim 13, wherein
said upper elastic member and said lower elastic member are attached to said load member in the top-bottom direction of said vehicle body, and
said upper arm and said lower arm are connected respectively to said upper elastic member and said lower elastic member in the top-bottom direction of said vehicle body.

15. The wheel supporting apparatus according to claim 14, wherein
said upper elastic member and said lower elastic member are each comprised of at least one elastic body.

16. The wheel supporting apparatus according to claim 15, wherein
said at least one elastic body is each a rubber mount.

17. The wheel supporting apparatus according to claim 14, wherein
said upper elastic member and said lower elastic member are each comprised of:
at least one first elastic body; and
a second elastic body different from said first elastic body.

18. The wheel supporting apparatus according to claim 17, wherein
said at least one first elastic body is each a rubber mount, and
said second elastic body is a spring.

19. The wheel supporting apparatus according to claim 17, wherein
said at least one first elastic body is each a spring, and
said second elastic body is a rubber mount.

20. The wheel supporting apparatus according to claim 5, wherein
said elastic member is comprised of a pair of elastic members,
said pair of elastic members is connected to said upper arm via a pair of arm members, and
said lower arm is provided to said load member and said pair of elastic members without connected to said load member and said pair of elastic members, said lower arm having one end connected to said rotatably supporting member and the other end fixed to said vehicle body pivotably in the top-bottom direction of said vehicle body.

21. The wheel supporting apparatus according to claim 20, wherein
said pair of elastic members is attached to said load member in the front-rear direction of said vehicle body,
said pair of arm members is connected to said pair of elastic members in the front-rear direction of said vehicle body,
said upper arm has one end connected to said rotatably supporting member and said pair of arm members and the other end fixed to said vehicle body pivotably in the top-bottom direction of said vehicle body, and said upper arm and said lower arm are placed in the top-bottom direction of said vehicle body.

22. The wheel supporting apparatus according to claim 20, wherein said elastic members of said pair of elastic members are placed on respective sides opposite to each other of said load member in a front-rear direction of said vehicle body and are able to expand and contract in the top-bottom direction of said vehicle body.

23. The wheel supporting apparatus according to claim 22, further comprising an extension member fixed to said load member and extending from said load member in the front-rear direction of said vehicle body, wherein said pair of elastic members has one end connected to said extension member and the other end connected to said pair of arm members (260, 270).

24. The wheel supporting apparatus according to claim 22, wherein said pair of elastic members includes a pair of suspensions.

* * * * *